US011342858B2

(12) United States Patent
Fujimura et al.

(10) Patent No.: US 11,342,858 B2
(45) Date of Patent: May 24, 2022

(54) POWER CONVERTER APPARATUS INCLUDING LLC RESONANT CIRCUITS AND WIDE RANGE OF OUTPUT VOLTAGE WITH HIGHER EFFICIENCY

(71) Applicant: PANASONIC INTELLECTUAL PROPERTY MANAGEMENT CO., LTD., Osaka (JP)

(72) Inventors: Motohiko Fujimura, Kanagawa (JP); Atsushi Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/050,661

(22) PCT Filed: Apr. 16, 2019

(86) PCT No.: PCT/JP2019/016257
§ 371 (c)(1),
(2) Date: Oct. 26, 2020

(87) PCT Pub. No.: WO2019/208318
PCT Pub. Date: Oct. 31, 2019

(65) Prior Publication Data
US 2021/0242781 A1 Aug. 5, 2021

(30) Foreign Application Priority Data
Apr. 26, 2018 (JP) .............................. JP2018-085661

(51) Int. Cl.
*H02M 3/337* (2006.01)
*H02M 3/338* (2006.01)
(Continued)

(52) U.S. Cl.
CPC ......... *H02M 3/337* (2013.01); *H02M 3/3382* (2013.01); *H02M 3/015* (2021.05); *H02M 3/33569* (2013.01)

(58) Field of Classification Search
CPC .. H02M 3/015; H02M 3/33569; H02M 3/337; H02M 3/3382
(Continued)

(56) References Cited

U.S. PATENT DOCUMENTS

2008/0278972 A1    11/2008  Kimura
2010/0149846 A1*   6/2010   Tan ..................... H02M 7/5387
                                                  363/132
(Continued)

FOREIGN PATENT DOCUMENTS

CN    106655793 A    5/2017
JP    2008-283819 A  11/2008
(Continued)

OTHER PUBLICATIONS

International Search Report issued is International Patent Application No. PCT/JP2019/016257, dated Jun. 18, 2019 with English translation.
(Continued)

*Primary Examiner* — Gary A Nash
(74) *Attorney, Agent, or Firm* — McDermott Will & Emery LLP

(57) ABSTRACT

A power converter apparatus is provided with: a plurality of leg circuits, each including two switch circuits connected in series between input terminals; a transformer including a primary winding and a secondary winding, the primary winding having a first terminal and a second terminal; and at least one capacitor. The at least one capacitor is connected between the first terminal or the second terminal of the primary winding of the transformer, and a node between the
(Continued)

two switch circuits in at least one leg circuit among the plurality of leg circuits. The first terminal of the primary winding of the transformer is connected to at least two nodes between the switch circuits in at least two first leg circuits among the plurality of leg circuits, via at least two first circuit portions having at least one of capacitances and inductances different from each other, respectively.

8 Claims, 22 Drawing Sheets

(51) Int. Cl.
  *H02M 3/335*   (2006.01)
  *H02M 3/00*   (2006.01)
(58) Field of Classification Search
  USPC .............................. 363/17, 21.01, 21.02, 132
  See application file for complete search history.

(56) References Cited

U.S. PATENT DOCUMENTS

| | | | | |
|---|---|---|---|---|
| 2013/0265804 | A1* | 10/2013 | Fu | H02M 3/33576 363/17 |
| 2014/0254208 | A1* | 9/2014 | Dai | H02M 3/33569 363/21.02 |
| 2015/0092450 | A1* | 4/2015 | Feno | H02M 3/33592 363/17 |
| 2015/0124489 | A1* | 5/2015 | Dai | H02M 3/335 363/17 |
| 2015/0180350 | A1* | 6/2015 | Huang | H02M 3/33507 307/66 |
| 2015/0263634 | A1* | 9/2015 | Fu | H02M 3/33569 363/21.02 |
| 2015/0333635 | A1* | 11/2015 | Yan | H02M 3/3376 363/17 |
| 2016/0072390 | A1* | 3/2016 | Akutagawa | H02M 3/33507 363/17 |
| 2016/0254756 | A1* | 9/2016 | Yang | H01F 30/12 363/21.02 |
| 2017/0244331 | A1* | 8/2017 | Guo | H02M 3/3376 |

FOREIGN PATENT DOCUMENTS

| | | |
|---|---|---|
| JP | 2017-147892 A | 8/2017 |
| JP | 2017147892 A * | 8/2017 |

OTHER PUBLICATIONS

International Preliminary Report and Patentability issued in International Patent Application No. PCT/JP2019/016257, dated Nov. 5, 2020.

Extended European Search Report dated May 21, 2021 in corresponding European Patent Application No. 19792153.9.

Japanese Office Action dated Aug. 17, 2021, in the corresponding Japanese Patent Application No. 2020-516249; with English translation.

* cited by examiner

POWER CONVERTER APPARATUS INCLUDING LLC RESONANT CIRCUITS AND WIDE RANGE OF OUTPUT VOLTAGE WITH HIGHER EFFICIENCY

CROSS-REFERENCE OF RELATED APPLICATIONS

This application is the U.S. National Phase under 35 U.S.C. § 371 of International Patent Application No. PCT/JP2019/016257, filed on Apr. 16, 2019, which in turn claims the benefit of Japanese Application No. 2018-085661, filed on Apr. 26, 2018, the entire disclosures of which Applications are incorporated by reference herein.

TECHNICAL FIELD

The present disclosure relates to a power converter apparatus that converts input power at a certain voltage into output power at another certain voltage.

BACKGROUND ART

In order to improve efficiency of a power converter apparatus that converts input power at a certain voltage into output power at another certain voltage, there is proposed an LLC resonant power converter apparatus provided with a plurality of switch elements, a transformer, an inductor, and a capacitor, the inductor and the capacitor being provided on a primary side of the transformer. A primary winding of the transformer, the inductor, and the capacitor constitute a resonant circuit (LLC resonant circuit).

For example, Patent Document 1 discloses an LLC resonant power converter apparatus.

CITATION LIST

Patent Documents

PATENT DOCUMENT 1: Japanese Patent Laid-open Publication No. JP 2017-147892 A

SUMMARY OF INVENTION

Technical Problem

The power converter apparatus may be required to generate various output voltages. In an LLC resonant power converter apparatus, an output voltage can be changed by changing switching frequency of switch elements. In general, the output voltage increases by decreasing the switching frequency, and the output voltage decreases by increasing the switching frequency.

In order to generate a wide range of output voltage, it is necessary to operate the switch elements over a wide range of switching frequency. When decreasing the switching frequency, iron loss in a transformer core increases, and when increasing the switching frequency, copper loss in transformer windings increases. In order to reduce the iron loss and the copper loss in a transformer, it is necessary to increase a size of the transformer. In addition, when increasing the switching frequency, losses in the switch elements also increase. According to the prior art, it is difficult to operate an LLC resonant power converter apparatus over a wide range of switching frequency, that is, generate a wide range of output voltage, without reducing efficiency.

An object of the present disclosure is to provide an LLC resonant power converter apparatus capable of generating a wide range of output voltage with higher efficiency than that of the prior art.

Solution to Problem

According to an aspect of the present disclosure, a power converter apparatus is provided with: a first input terminal and a second input terminal; a plurality of leg circuits, each of the plurality of leg circuits including two switch circuits connected in series with each other between the first input terminal and the second input terminal; a transformer including a primary winding and a secondary winding, the primary winding having a first terminal and a second terminal; and at least one capacitor. The at least one capacitor is connected between the first terminal or the second terminal of the primary winding of the transformer, and a node between the two switch circuits in at least one leg circuit among the plurality of leg circuits. The first terminal of the primary winding of the transformer is connected to at least two nodes in at least two first leg circuits among the plurality of leg circuits via at least two first circuit portions, respectively, each of the at least two nodes being disposed between the two switch circuits in one of the at least two first leg circuits, at least one of capacitances and inductances being different in the at least two first circuit portions.

Advantageous Effects of Invention

According to the aspect of the present disclosure, the power converter apparatus is provided, which is an LLC resonant power converter apparatus capable of generating a wide range of output voltage with higher efficiency than that of the prior art.

DESCRIPTION OF EMBODIMENTS

Embodiments according to the present disclosure will be described below with reference to the drawings. In the following embodiments, similar components are denoted by the same reference signs.

First Embodiment

Figure 1:
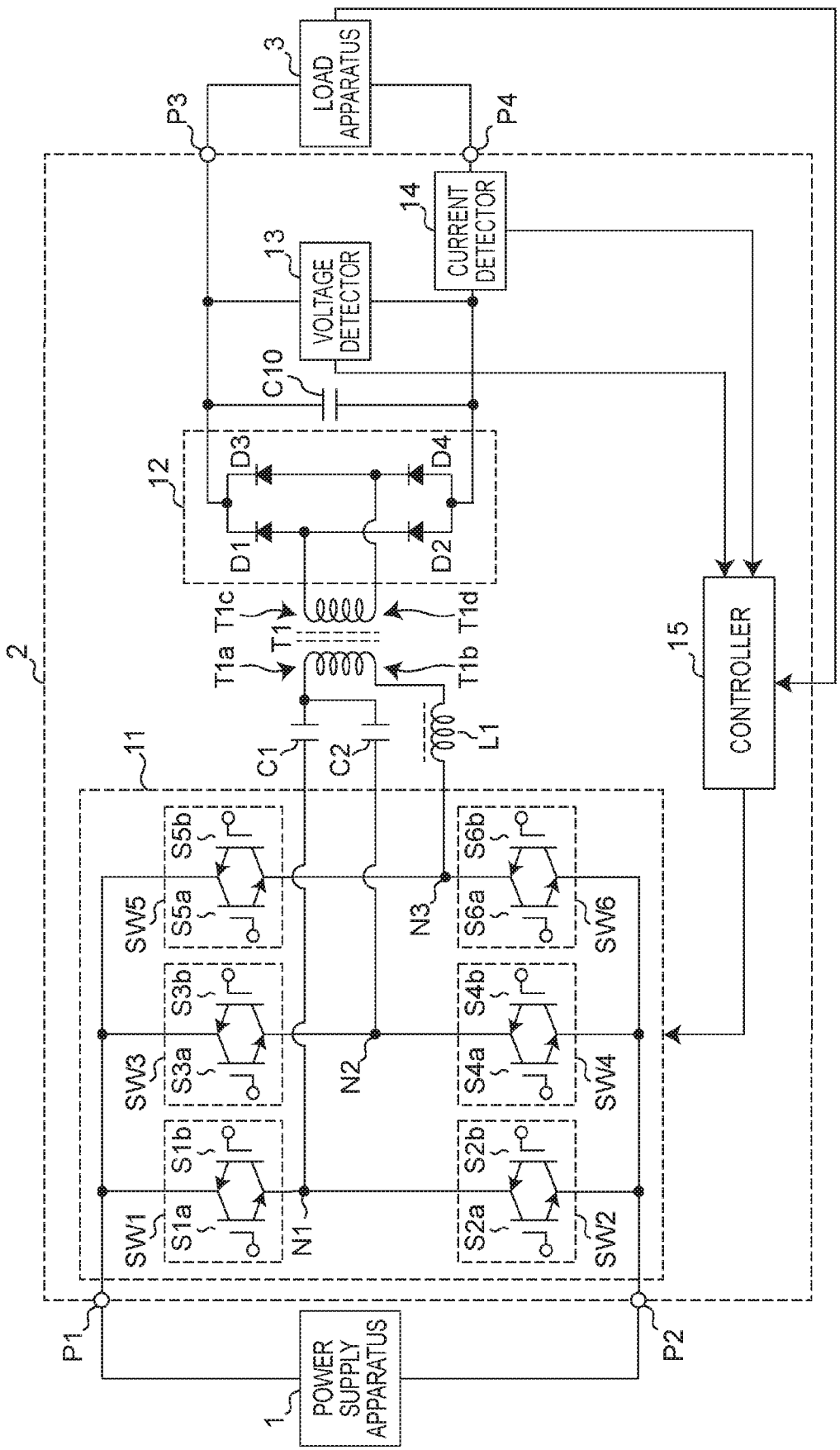
FIG. 1 is a block diagram showing a configuration of a power converter apparatus 2 according to a first embodiment.

FIG. 1 is a block diagram showing a configuration of a power converter apparatus 2 according to a first embodiment. The power converter apparatus 2 is connected to a power supply apparatus 1 for direct current, and connected to a load apparatus 3 for direct current. The power converter apparatus 2 converts input power at a certain voltage, which is supplied from the power supply apparatus 1, into output power at another certain voltage, and supplies the output power to the load apparatus 3.

The power converter apparatus 2 is provided with: input terminals P1, P2, a switch circuit group 11, capacitors C1, C2, an inductor L1, a transformer T1, a diode bridge 12, a capacitor C10, output terminals P3, P4, a voltage detector 13, a current detector 14, and a controller 15.

The input terminals P1, P2 are connected to the power supply apparatus 1.

In the present disclosure, the input terminal P1 is also referred to as a "first input terminal", and an input terminal P2 is also referred to as a "second input terminal".

The switch circuit group 11 includes a plurality of leg circuits, each of the plurality of leg circuits including two switch circuits connected in series with each other between the input terminals P1, P2. In the example of FIG. 1, the switch circuit group 11 includes a leg circuit including switch circuits SW1, SW2, a leg circuit including switch circuits SW3, SW4, and a leg circuit including switch circuits SW5, SW6.

The switch circuit SW1 is provided with two switch elements S1a, S1b. The switch element S1a allows a current to flow only in a first direction (downward direction in FIG. 1) when turned on, and blocks the current when turned off. The switch element S1b allows a current to flow only in a second direction (upward direction in FIG. 1) opposite to the first direction when turned on, and blocks the current when turned off. Accordingly, the switch circuit SW1 selectively changes among a state where the current flows in the first direction, a state where the current flows in the second direction, and a state where no current flows in the first direction nor in the second direction. The switch elements S1a, S1b are, for example, reverse-blocking insulated gate bipolar transistors (IGBTs) with a sufficient withstand voltage against a reverse bias voltage.

The other switch circuits SW2 to SW6 include switch elements S2a to S6b, and are configured in a manner similar to that of the switch circuit SW1.

The switch circuits SW1 to SW6 constitute a full bridge circuit.

The transformer T1 is provided with a primary winding having terminals T1a, T1b, and a secondary winding having terminals T1c, T1d.

In the present disclosure, the terminal T1a is also referred to as a "first terminal" of the primary winding of the transformer T1, and the terminal T1b is also referred to as a "second terminal" of the primary winding of the transformer T1.

The terminal T1a of the primary winding of the transformer T1 is connected to a node N1 between the switch circuits SW1, SW2, via the capacitor C1. The terminal T1a of the primary winding of the transformer T1 is further connected to a node N2 between the switch circuits SW3, SW4, via a capacitor C2 having capacitance different from that of the capacitor C. The terminal T1b of the primary winding of the transformer T1 is connected to a node N3 between the switch circuits SW5, SW6, via the inductor L.

In the present disclosure, at least two leg circuits connected to the same terminal T1a (the leg circuit including the switch circuits SW1, SW2, and the leg circuit including the switch circuits SW3, SW4) are also referred to as "first leg circuits". In addition, in the present disclosure, at least two circuit portions (capacitors C1, C2 in the example of FIG. 1) are also referred to as "first circuit portions", the at least two circuit portions being connected between the terminal T1a and each of the nodes N1, N2, each of the nodes N1, N2 being disposed between the two switch circuits in one of the first leg circuits, and at least one of capacitances and inductances being different in the at least two circuit portions. In addition, in the present disclosure, another leg circuit connected to another terminal T1b (the leg circuit including the switch circuits SW5, SW6) is also referred to as a "second leg circuit".

The diode bridge 12 is connected between the secondary winding of the transformer T1 and the output terminals P3, P4. The diode bridge 12 is provided with diodes D1 to D4. The diode bridge 12 rectifies a current generated in the secondary winding of the transformer T1.

The capacitor C10 smooths the current rectified by the diode bridge 12.

The output terminals P3, P4 are connected to the load apparatus 3.

In the present disclosure, the output terminal P3 is also referred to as a "first output terminal", and the output terminal P4 is also referred to as a "second output terminal".

The voltage detector 13 detects an output voltage Vout outputted from the power converter apparatus 2 to the load apparatus 3, and notifies the controller 15 of the detected output voltage Vout. The current detector 14 detects an output current Iout outputted from the power converter apparatus 2 to the load apparatus 3, and notifies the controller 15 of the detected output current Iout.

The controller 15 receives a request signal from the load apparatus 3, the request signal indicating magnitude of a target voltage Vreq to be outputted to the load apparatus 3. Based on the target voltage Vreq, the output voltage Vout, and the output current Iout, the controller 15 generates control signals to be applied to gate terminals of the switch elements S1a to S6b, in order to control the switch circuits SW1 to SW6. The controller 15 operates the two switch circuits in one of the two leg circuits, one including the switch circuits SW1, SW2, and another including the switch circuits SW3, SW4, at a certain switching frequency fs, and makes the two switch circuits in the other leg circuit inoperative. In this case, "operating" a switch circuit means periodically repeating turning on and off the two switch elements at a switching frequency fs. On the other hand, making a switch circuit inoperative means keeping the two switch elements off during cycles of switching frequency fs.

Figure 2:
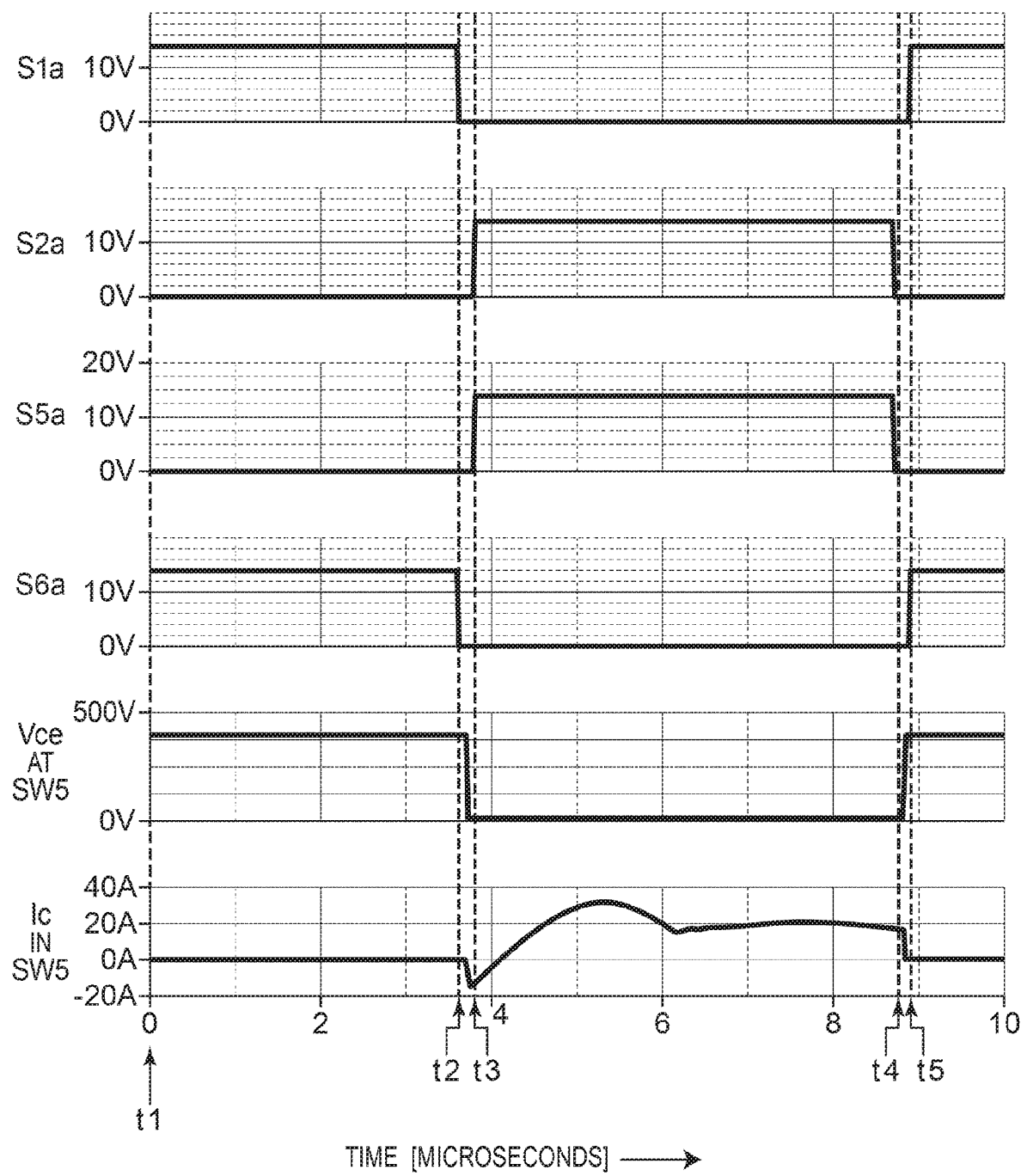
FIG. 2 is a waveform chart for explaining basic operation of the power converter apparatus 2 of FIG. 1.

FIG. 2 is a waveform chart for explaining basic operation of the power converter apparatus 2 of FIG. 1. FIG. 2 shows a case where the switch circuits SW1, SW2, SW5, SW6 are operated at a certain switching frequency fs, and the switch circuits SW3, SW4 are made inoperative. A first row to a fourth row in FIG. 2 indicate control signals applied to the gate terminals of the switch elements S1a, S2a, S5a, S6a. A fifth row in FIG. 2 shows a voltage Vce (collector-emitter voltage) applied across the switch circuit SW5. A sixth row in FIG. 2 shows a current Ic (collector current) flowing through the switch circuit SW5.

During an entire time period shown in FIG. 2, the switch elements S1b, S2b, S5b, S6b are turned on.

During a time interval from time moment t1 to t2 of FIG. 2, the switch elements S1a, S6a are turned on. At this time, a current flows through a path of "P1->S1a->C1->T1->L1->S6a->P2".

At time moment t2 of FIG. 2, the switch elements S1a, S6a are turned off, and then, a current flows through a path of "P2->S2b->C1->T->L1->S5b->P1". During a time interval in which a negative current flows through the switch circuits SW2, SW5, the switch elements S2a, S5a are turned on at time moment t3. Accordingly, the switch circuits SW2, SW5 operate so as to achieve zero voltage switching.

During a time interval from time moment t3 to t4 of FIG. 2, the switch elements S2a, S5a are turned on. At this time, a current flows through a path of "P1->S5a->L1->T1->C1->S2a->P2".

At time moment t4 of FIG. 2, the switch elements S2a, S5a are turned off, and then, a current flows through a path of "P2->S6b->L1->T1->C1>S1b->P1". During a time interval in which a negative current flows through the switch circuits SW1, SW6, the switch elements S1a, S6a are turned on at time moment t5. Accordingly, the switch circuits SW1, SW6 operate so as to achieve zero voltage switching.

Also in a case where the switch circuits SW3 to SW6 are operated at a certain switching frequency fs, and the switch circuits SW1, SW2 are made inoperative, the power converter apparatus 2 operates substantially in a manner similar to that of FIG. 2.

The power converter apparatus 2 is provided with at least one capacitor C1, C2, and at least one inductor L1, which are connected between the terminal T1a or T1b of the primary winding of the transformer T1 and the nodes N1, N2 between the two switch circuits in at least one leg circuit. Accordingly, the primary winding of the transformer T1, the inductor L1, and the capacitor C1 constitute an LLC resonant circuit. In addition, the primary winding of the transformer T1, the inductor L1, and the capacitor C2 constitute another LLC resonant circuit.

Next, operation of a conventional LLC resonant power converter apparatus will be described.

Assumed as an exemplary conventional power converter apparatus is a circuit provided with: a transformer; four switch elements, an inductor, and a capacitor, which are provided on a primary side of the transformer; and a diode bridge and a capacitor, which are provided on a secondary side of the transformer. The four switch elements are connected in a bridge configuration. The inductor and the capacitor on the primary side are connected between a node between two switch elements in one leg circuit, and the primary winding of the transformer.

The following parameters are introduced for this power converter apparatus.

fs: Switching frequency of switch elements
L1: Inductance of inductor
Np: Number of turns of primary winding of transformer
Ns: Number of turns of secondary winding of transformer
Ae: Effective cross-section area of transformer
Lp: Inductance of primary winding of transformer
Vf: Forward voltage of each diode in diode bridge
Vo: Output voltage of power converter apparatus In this case, a maximum change AB in magnetic flux density of the transformer is denoted as follows.

$$\Delta B = \frac{n(Vo + Vf)}{2 \cdot fs \cdot Mv \cdot Np \cdot Ae} \quad \text{[Mathematical Expression 1]}$$

Where, n=Np/Ns. In addition, Mv corresponds to an inverse of a degree of coupling, and is denoted as follows.

$$Mv = \sqrt{\frac{L1 + Lp}{Lp}} \quad \text{[Mathematical Expression 2]}$$

Iron loss Pcv of the transformer is approximately calculated by Steinmetz's equation as follows.

$$Pcv = Cm \cdot fs^x \cdot \Delta B^y \cdot Ae \cdot le \quad \text{[Mathematical Expression 3]}$$

Where, Cm, x, and y are coefficients depending on a type of a core of the transformer. le indicates an effective magnetic path length.

According to Mathematical Expressions 1 to 3, it is understood that the iron loss in the core of the transformer increases as the switching frequency fs decreases, as described above.

In addition, the copper loss in the windings of the transformer increases, and losses in the switch elements also increase, as the switching frequency increases, as described above.

Next, it is described that the power converter apparatus 2 according to the first embodiment generates a wide range of output voltage with higher efficiency than that of the prior art.

Figure 3:
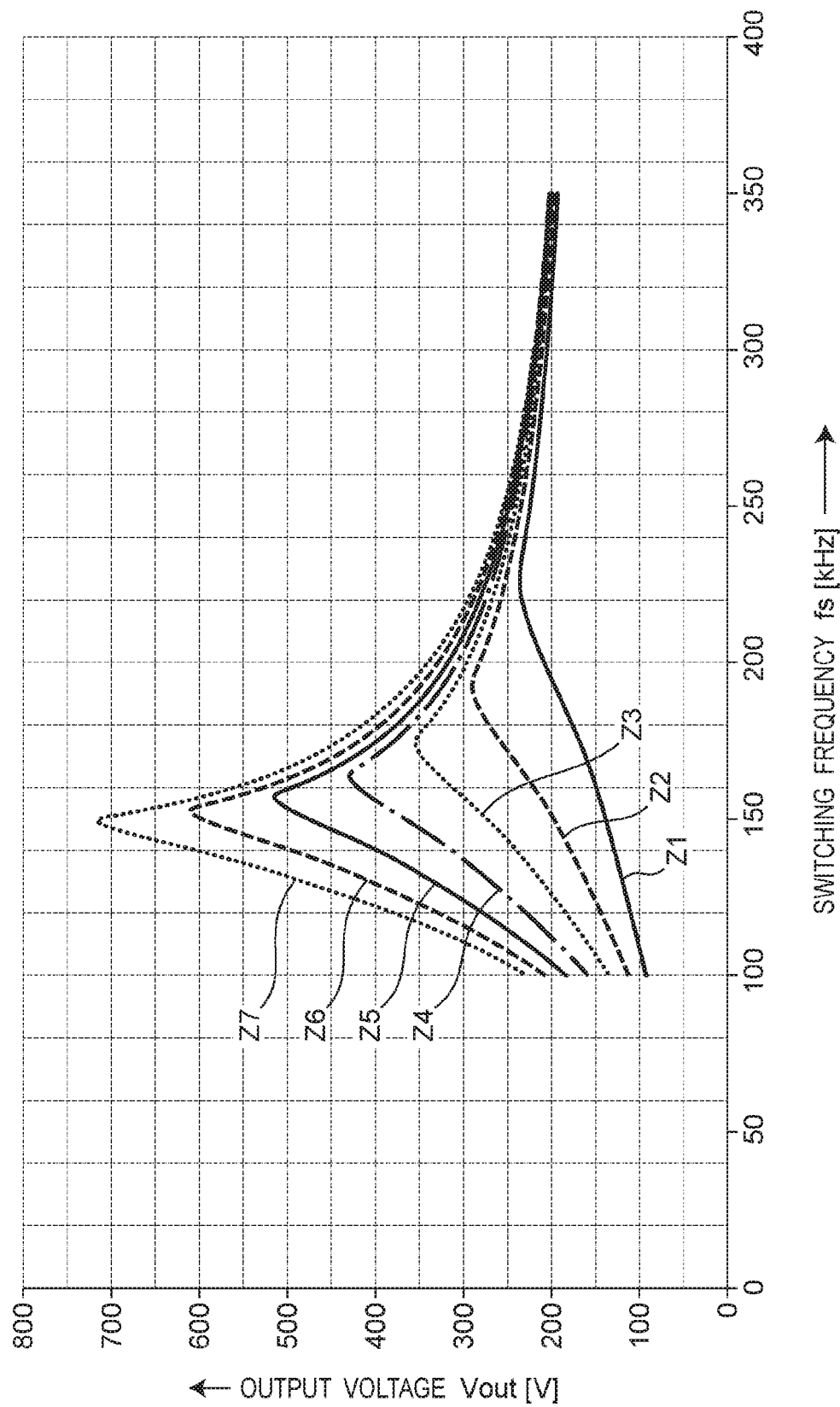
FIG. 3 is a graph showing a characteristic of output voltage Vout versus switching frequency fs of the power converter apparatus 2 in case of operating an LLC resonant circuit including a capacitor C1 of FIG. 1.

FIG. 3 is a graph showing a characteristic of output voltage Vout versus switching frequency fs of the power converter apparatus 2 in case of operating the LLC resonant circuit including the capacitor C1 of FIG. 1. In this case, the switch circuits SW1, SW2, SW5, SW6 are operated at a certain switching frequency fs, and the switch circuits SW3, SW4 are made inoperative. Accordingly, an LLC resonant circuit including the primary winding of the transformer T1, the inductor L1, and the capacitor C1 is configured.

The power converter apparatus 2 has a ratio of output voltage Vout to input voltage Vin, that is, gain, which differs depending on capacitance and inductance included in a path from the input terminal P1 to the input terminal P2, via a switch circuit turned on and the primary winding of the transformer T1, and differs depending on impedance or resistance of the load apparatus 3.

Gain K of the power converter apparatus 2 is formulated, for example, as follows.

$$K(Q, m, f) = \frac{(f^2 \cdot (m-1))}{\sqrt{(m \cdot f^2 - 1)^2 + f^2 \cdot (f^2 - 1)^2 \cdot (m-1)^2 \cdot Q^2}} \quad \text{[Mathematical Expression 4]}$$

In this case, the following parameters are used.
Q: Q value related to capacitor C1 and inductor L1
n: Ratio of total inductance of primary side to inductance of inductor L1
f: Normalized switching frequency
The Q value is given as follows.

$$Q = \frac{\sqrt{L1/C1}}{Rac} \quad \text{[Mathematical Expression 5]}$$

$$Rac = \frac{8}{\pi^2} \cdot \frac{Np^2}{Ns^2} \cdot Ro \quad \text{[Mathematical Expression 6]}$$

Where, Ro indicates impedance or resistance of the load apparatus 3, and Rac indicates reflected load resistance.

Ratio m of the inductances is obtained by: n=(L1+Lp)/L1.

The normalized switching frequency f is obtained by: f=fs/fr, where fr denotes a resonance frequency related to the capacitor C1 and the inductor L1, obtained as follows.

$$fr = \frac{1}{2\pi\sqrt{L1 \cdot C1}} \quad \text{[Mathematical Expression 7]}$$

The gain K equivalently represents a ratio of an alternating current output voltage on the secondary side of the transformer T1, to an alternating current input voltage to the LLC resonant circuit on the primary side of the transformer T1.

The output voltage Vout of FIG. 3 is obtained by multiplying the gain K by an input voltage Vin of the power converter apparatus 2.

According to Mathematical Expression 4, it is understood that the power converter apparatus 2 generates an output voltage Vout that differs depending on capacitance and inductance of an LLC resonant circuit, differs depending on impedance or resistance of the load apparatus 3, and differs depending on switching frequency fs.

Impedance or resistance of the load apparatus 3 is obtained as a ratio of output voltage Vout to output current Iout, which is Vout/Iout, based on the output voltage Vout and the output current Iout detected by the voltage detector 13 and the current detector 14. Impedance or resistance of the load apparatus 3 may be obtained as Vout/Pout based on output power Pout.

In FIG. 3, the following values were set.
Vin=400 V
Lp=38 µH
L1=6 µH
C1=80 nF
Np:Ns=15:7

In addition, in FIG. 3, impedances Z1 to Z7 of the load apparatus 3 were set as described below. In this case, under a condition that the power converter apparatus 2 generates constant output power Pout=Vout×Iout=7040 W, the following output voltage Vout and output current Iout are detected by the voltage detector 13 and the current detector 14.
Z1=5.7Ω (Vout=200 V, Iout=35.2 A)
Z2=8.9Ω (Vout=250 V, Iout=28.2 A)
Z3=12.8Ω (Vout=300 V, Iout=23.4 A)
Z4=17.4Ω (Vout=350 V, Iout=20.1 A)
Z5=22.7Ω (Vout=400 V, Iout=17.6 A)
Z6=28.8Ω (Vout=450 V, Iout=15.6 A)
Z7=35.5Ω (Vout=500 V, Iout=14.1 A)

As shown in FIG. 3, plots of different characteristics were obtained depending on the impedances Z1 to Z7.

Figure 4:
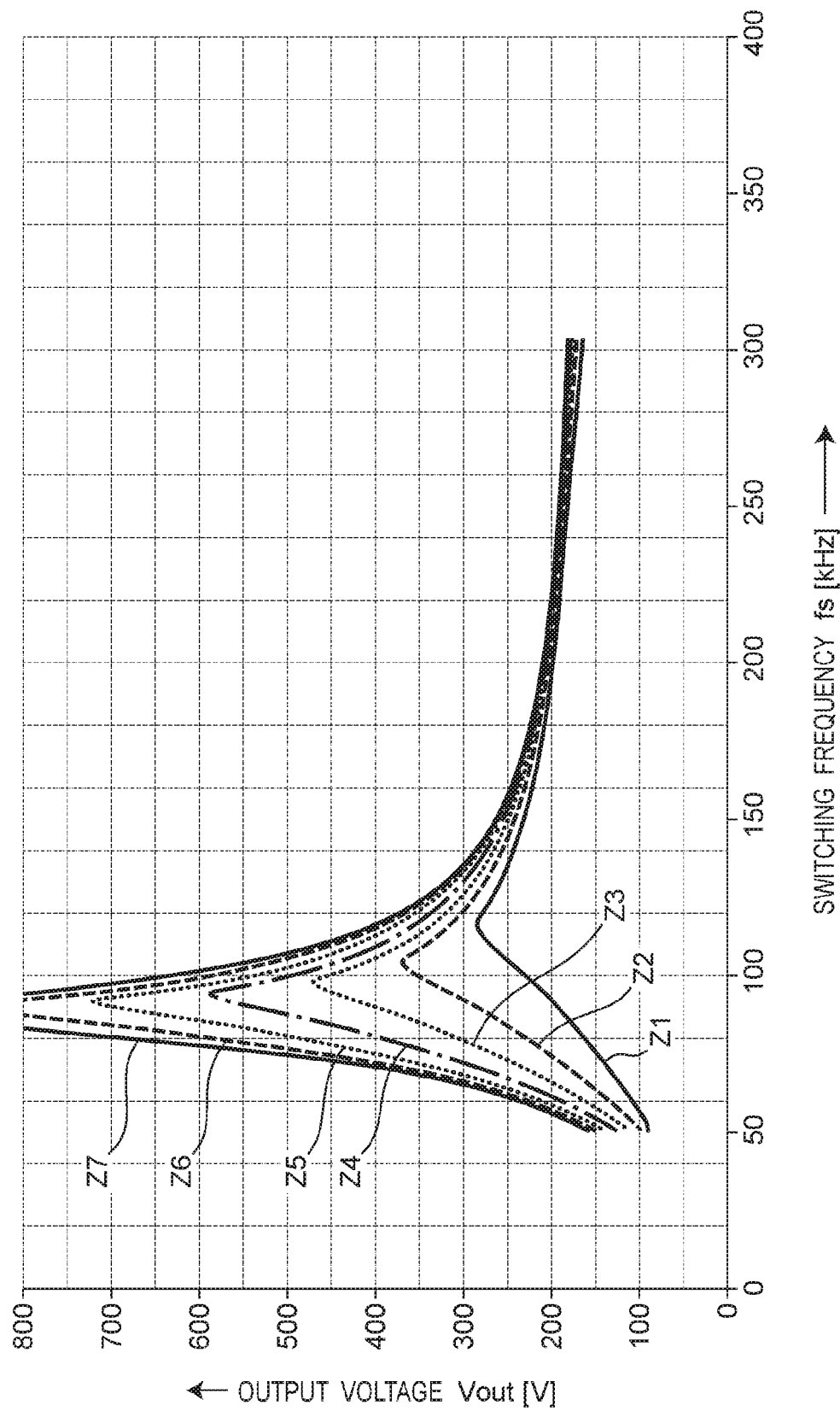
FIG. 4 is a graph showing a characteristic of output voltage Vout versus switching frequency fs of the power converter apparatus 2 in case of operating an LLC resonant circuit including a capacitor C2 of FIG. 1.

FIG. 4 is a graph showing a characteristic of output voltage Vout versus switching frequency fs of the power converter apparatus 2 in case of operating the LLC resonant circuit including the capacitor C2 of FIG. 1. In this case, the switch circuits SW3 to SW6 are operated at a certain switching frequency fs, and the switch circuits SW1, SW2 are made inoperative. Accordingly, the LLC resonant circuit including the primary winding of the transformer T1, the inductor L1, and the capacitor C2 is configured.

In FIG. 4, the following values were set.
Vin=400 V
Lp=38 µH
L1=6 µH
C2=30 nF
Np:Ns=15:7

In addition, also in FIG. 4, the same impedances Z1 to Z7 of the load apparatus 3 as that of FIG. 3 were set.

According to FIG. 3 and FIG. 4, it is understood that the power converter apparatus 2 generates an output voltage Vout that differs depending on capacitance C1 or C2 of an LLC resonant circuit, differs depending on impedances Z1 to Z7 of the load apparatus 3, and differs depending on switching frequency fs. When the power converter apparatus 2 operates at the same switching frequency fs, in general, the output voltage Vout in the case of operating the LLC resonant circuit including the capacitor C1 is higher than the output voltage Vout in the case of operating the LLC resonant circuit including the capacitor C2. In addition, when the power converter apparatus 2 operates at the same output voltage Vout, in general, the switching frequency fs in the case of operating the LLC resonant circuit including the capacitor C1 is higher than the switching frequency fs in the case of operating the LLC resonant circuit including the capacitor C2. Therefore, the power converter apparatus 2 is capable of generating a wide range of output voltage with higher efficiency than that of the prior art, by selectively operating the LLC resonant circuit including the capacitor C1, and the LLC resonant circuit including the capacitor C2, as described below.

The controller 15 determines, among at least two first leg circuits, a first leg circuit(s) including operating switch circuits, and another first leg circuit(s) including inoperative switch circuits, based on which of a plurality of predetermined voltage ranges includes the output voltage Vout. Accordingly, the controller 15 selectively operates the LLC resonant circuit including the capacitor C1, and the LLC resonant circuit including the capacitor C2.

In addition, the controller 15 determines the switching frequency fs based on capacitance and inductance included in a path from the input terminal P1 to the input terminal P2, via the switch circuit turned on by the controller 15, and the primary winding of the transformer T, and further based on the output voltage Vout and the output current Iout, and the target voltage Vreq outputted to the load apparatus 3. According to this path, it is determined whether the LLC resonant circuit in use includes the capacitor C1 or the capacitor C2. In addition, according to the output voltage Vout and the output current Iout, the impedance or resistance of the load apparatus 3 can be determined as described above. A characteristic of output voltage Vout versus switching frequency fs of the power converter apparatus 2 is determined based on an LLC resonant circuit in use, and the impedance or resistance of the load apparatus 3. At this time, it is possible to determine whether to increase or decrease the switching frequency fs, based on the target voltage Vreq.

In both the case of operating the LLC resonant circuit including the capacitor C1, and the case of operating the LLC resonant circuit including the capacitor C2, the characteristic of output voltage Vout versus switching frequency fs of the power converter apparatus 2 is known when designing and manufacturing the power converter apparatus 2. The controller 15 compares characteristics of the plurality of LLC resonant circuits, and determines an LLC resonant circuit to be operated. Conditions for determining the LLC resonant circuit to be operated are determined in consideration of the characteristic of output voltage Vout versus switching frequency fs (for example, a gradient of a curve), a range of output voltage Vout of the power converter apparatus 2, characteristics of the transformer T1, or the like. For example, in consideration of a trade-off of loss in the transformer T1, an intermediate voltage within a range of output voltage Vout (that is, (maximum voltage+minimum voltage)÷2) is set as a threshold for determining an LLC resonant circuit to be operated. From the minimum voltage to the intermediate voltage, an LLC resonant circuit with which the output voltage largely changes in a lower switching frequency range is used. From the intermediate voltage to the maximum voltage, an LLC resonant circuit with which the output voltage largely changes in a higher switching frequency range is used. Accordingly, it is less likely to produce loss in the transformer T1. A threshold different from the intermediate voltage may be used according to characteristics of the LLC resonant circuit to be operated.

Figure 5:
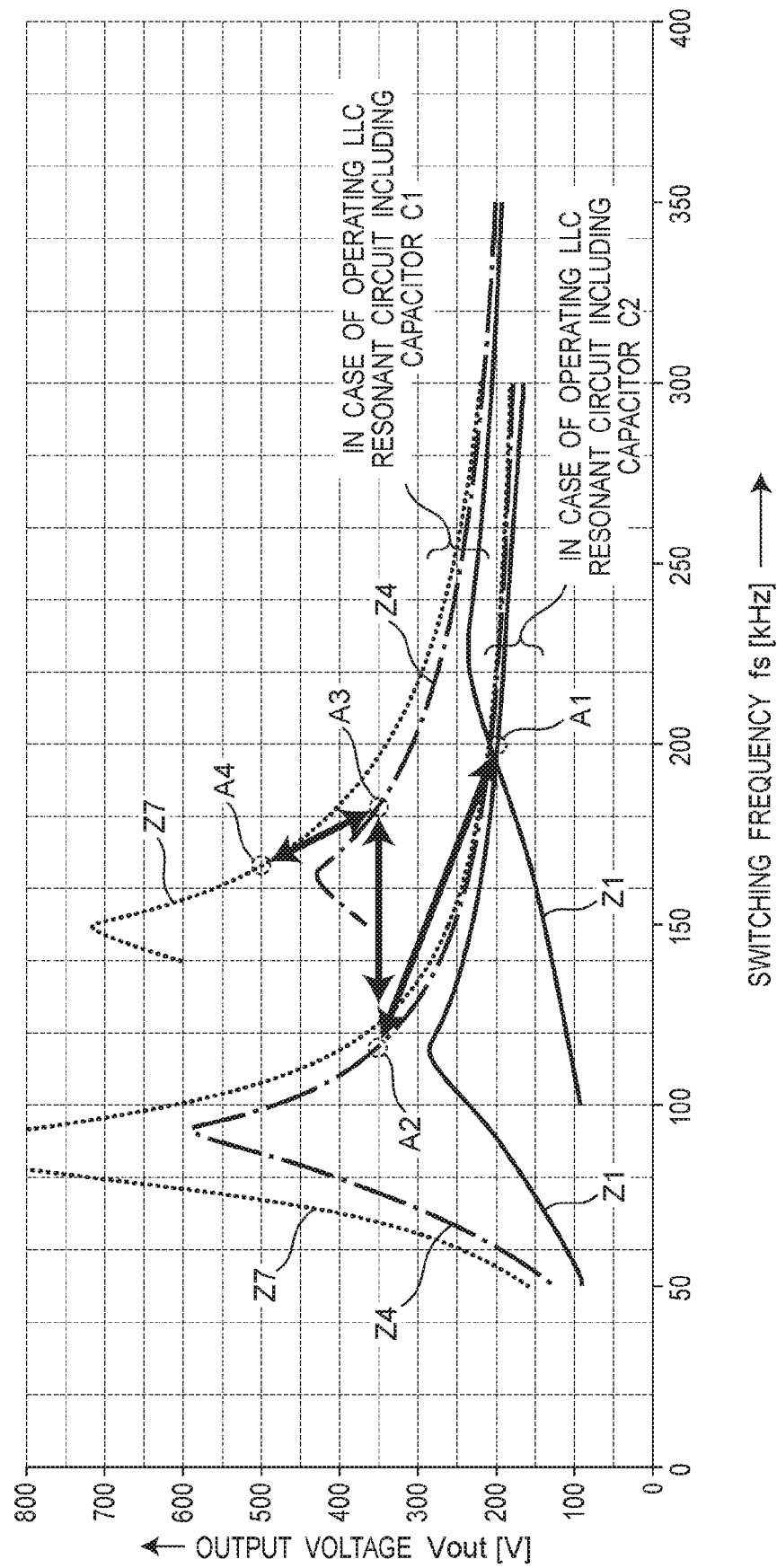
FIG. 5 is a graph for explaining determination of an LLC resonant circuit and a switching frequency fs by a controller 15 of FIG. 1.

FIG. 5 is a graph for explaining determination of an LLC resonant circuit and a switching frequency fs by the controller 15 of FIG. 1. FIG. 5 shows only cases of setting the impedances Z1, Z4, and Z7 of the load apparatus 3, among the plots of FIGS. 3 and 4, for ease of illustration. In the example of FIG. 5, a first leg circuit including operating switch circuits, and another first leg circuit including inoperative switch circuits are determined among the two first leg circuits, based on whether the output voltage Vout is included in a voltage range of 350 V or more, or included in a voltage range of less than 350 V, where Vout=350 V is a threshold.

For example, when an initial output voltage Vout=200 is lower than the threshold voltage 350 V, and a target voltage Vreq=500 is higher than the threshold voltage 350 V, the power converter apparatus 2 operates as described below. At first, when the output voltage Vout is less than the threshold voltage 350 V (point A1 to A2), the controller 15 operates the switch circuits SW3 to SW6, makes the switch circuits SW1, SW2 inoperative, thus operating the LLC resonant circuit including the capacitor C2. Accordingly, the power converter apparatus 2 can generate a low output voltage Vout, while operating at a relatively low switching frequency fs. The controller 15 gradually increases the output voltage Vout by gradually decreasing the switching frequency fs. When the output voltage Vout has reached the threshold voltage 350 V (point A2), the controller 15 operates the switch circuits SW1, SW2, SW5, SW6, makes the switch circuits SW3, SW4 inoperative, thus operating the LLC resonant circuit including the capacitor C1. At the same time, the controller 15 changes the switching frequency fs according to the characteristics of the LLC resonant circuit including the capacitor C1 (point A2->point A3). Accordingly, the power converter apparatus 2 can generate a high output voltage Vout, while operating at a relatively high switching frequency fs. The controller 15 gradually increases the output voltage Vout to the target voltage Vreq (point A3 to A4) by gradually decreasing the switching frequency fs.

For example, when an initial output voltage Vout=500 is higher than the threshold voltage 350 V, and a target voltage Vreq=200 is lower than the threshold voltage 350 V, the power converter apparatus 2 operates as described below. At first, when the output voltage Vout is equal to or higher than the threshold voltage 350 V (point A3 to A4), the controller 15 operates the switch circuits SW1, SW2, SW5, SW6, makes the switch circuits SW3, SW4 inoperative, thus operating the LLC resonant circuit including the capacitor C1. Accordingly, the power converter apparatus 2 can generate a high output voltage Vout, while operating at a relatively high switching frequency fs. The controller 15 gradually decreases the output voltage Vout by gradually increasing the switching frequency fs. When the output voltage Vout has reached the threshold voltage 350 V (point A3), the controller 15 operates the switch circuits SW3 to SW6, makes the switch circuits SW1, SW2 inoperative, thus operating the LLC resonant circuit including the capacitor C2. At the same time, the controller 15 changes the switching frequency fs according to the characteristics of the LLC resonant circuit including the capacitor C2 (point A3->point A2). Accordingly, the power converter apparatus 2 can generate a low output voltage Vout, while operating at a relatively low switching frequency fs. The controller 15 gradually decreases the output voltage Vout to the target voltage Vreq (point A2 to A1) by gradually increasing the switching frequency fs.

In the case of operating only the LLC resonant circuit including the capacitor C1, for example, in order to generate an output voltage Vout in a range of 200 V to 500 V, the switching frequency fs must be changed over a range of about 160 kHz to 330 kHz. In addition, in the case of operating only the LLC resonant circuit including the capacitor C2, for example, in order to generate an output voltage Vout in a range of 200 V to 500 V, the switching frequency fs must be changed over a range of about 100 kHz to 200 kHz. On the other hand, the power converter apparatus 2 can generate an output voltage Vout in a range of 200 V to 500 V, by selectively operating the LLC resonant circuit including the capacitor C1, and the LLC resonant circuit including the capacitor C2, to change the switching frequency fs over a range of about 120 kHz to 200 kHz. Thus, according to the power converter apparatus 2, it is less likely to produce loss associated with low switching frequency fs and high switching frequency fs, by reducing a range in which the switching frequency fs varies.

Figure 6:
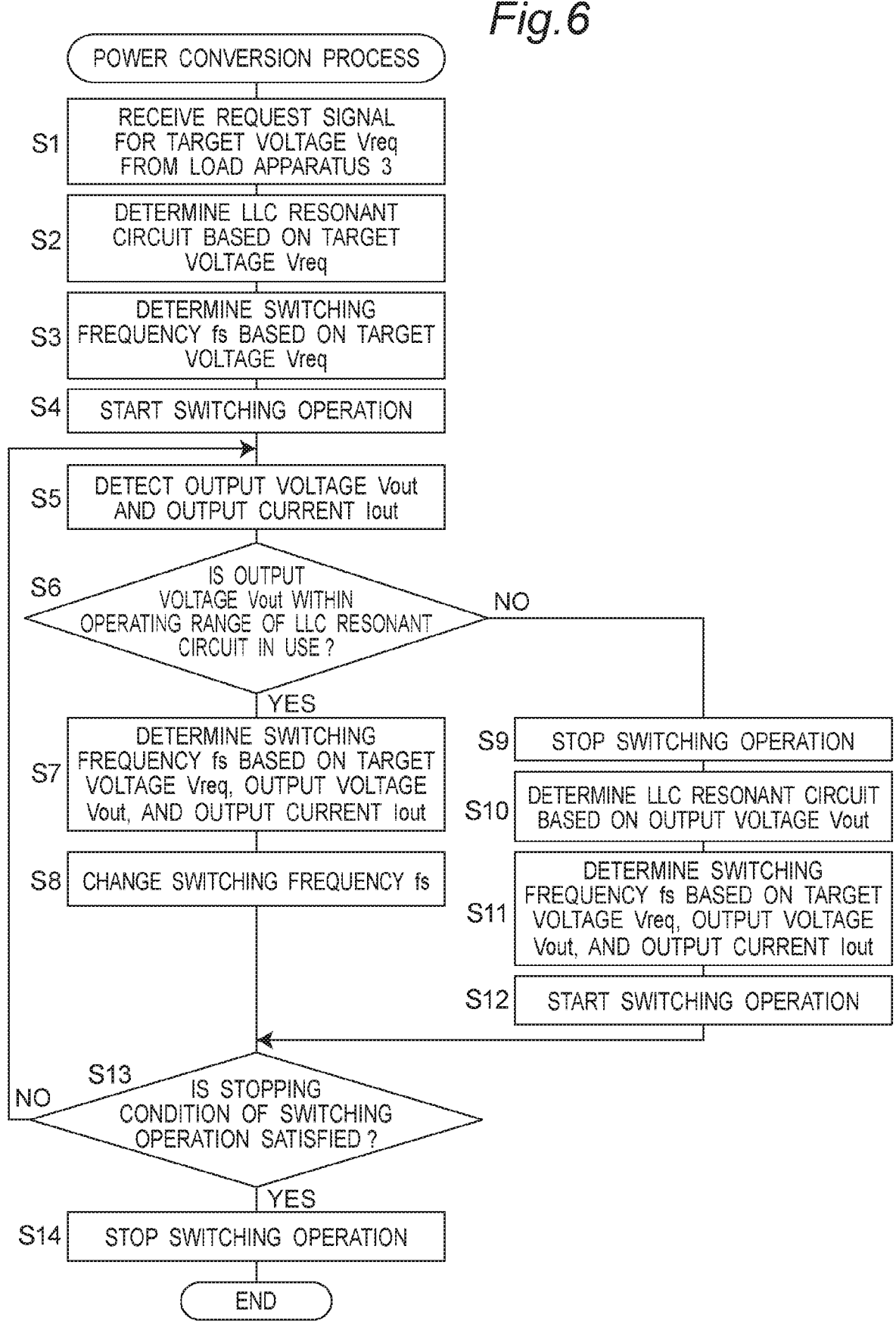
FIG. 6 is a flowchart showing power conversion process executed by the controller 15 of FIG. 1.

FIG. 6 is a flowchart showing power conversion process executed by the controller 15 of FIG. 1.

In an initial state of power conversion process of FIG. 6, only the controller 15 operates, the switch circuits SW1 to SW6 are inoperative, and the output voltage Vout is zero.

In Step S1, the controller 15 receives a request signal of a target voltage Vreq from the load apparatus 3. In Step S2, the controller 15 determines an LLC resonant circuit based on, which of a plurality of predetermined voltage ranges includes the target voltage Vreq (for example, whether or not the target voltage Vreq is equal to or higher than a threshold voltage 350 V). In Step S3, the controller 15 determines a switching frequency fs based on the target voltage Vreq. At this time, although impedance or resistance of the load apparatus 3 is unknown, the controller 15 determines the switching frequency fs using a characteristic of output voltage Vout versus switching frequency fs, which is determined based on some initial impedance Z of the load apparatus 3. In Step S4, the controller 15 starts switching operation of the switch circuits.

In Step S5, the controller 15 detects an output voltage Vout and an output current Iout. In Step S6, the controller 15 determines whether or not the output voltage Vout is within an operating range of an LLC resonant circuit in use (for example, whether or not the output voltage Vout is equal to or higher than the threshold voltage 350 V); if YES, the process proceeds to Step S7, and if NO, the process proceeds to Step S9.

In Step S7, the controller 15 determines a switching frequency fs based on the target voltage Vreq, the output voltage Vout, and the output current Iout. In Step S8, the controller 15 changes the switching frequency fs.

In Step S9, the controller 15 stops switching operation of the switch circuits. In Step S10, the controller 15 determines an LLC resonant circuit based on the output voltage Vout. In Step S11, the controller 15 determines a switching frequency fs based on the target voltage Vreq, the output voltage Vout, and the output current Iout. In Step S12, the controller 15 starts switching operation of the switch circuits.

In Step S13, the controller 15 determines whether or not a stop condition of the switching operation is satisfied; if YES, the process proceeds to S14, and if NO, the process returns to Step S5. The stop conditions include that, for example, in a case where the load apparatus 3 is a charging apparatus, the controller 15 receives a notification signal indicating full charge from the load apparatus 3, and the like. In addition, the stop conditions may include detecting some abnormality (operation of a protection circuit), receiving an external stop signal, and the like. In Step S14, the controller 15 stops switching operation of the switch circuits.

FIG. 6 shows operation in a case where power supply to the load apparatus 3 may be temporarily stopped. On the other hand, in a case where power supply to the load apparatus 3 cannot be stopped, for example, the power converter apparatus 2 operates as described below.

Figure 7:
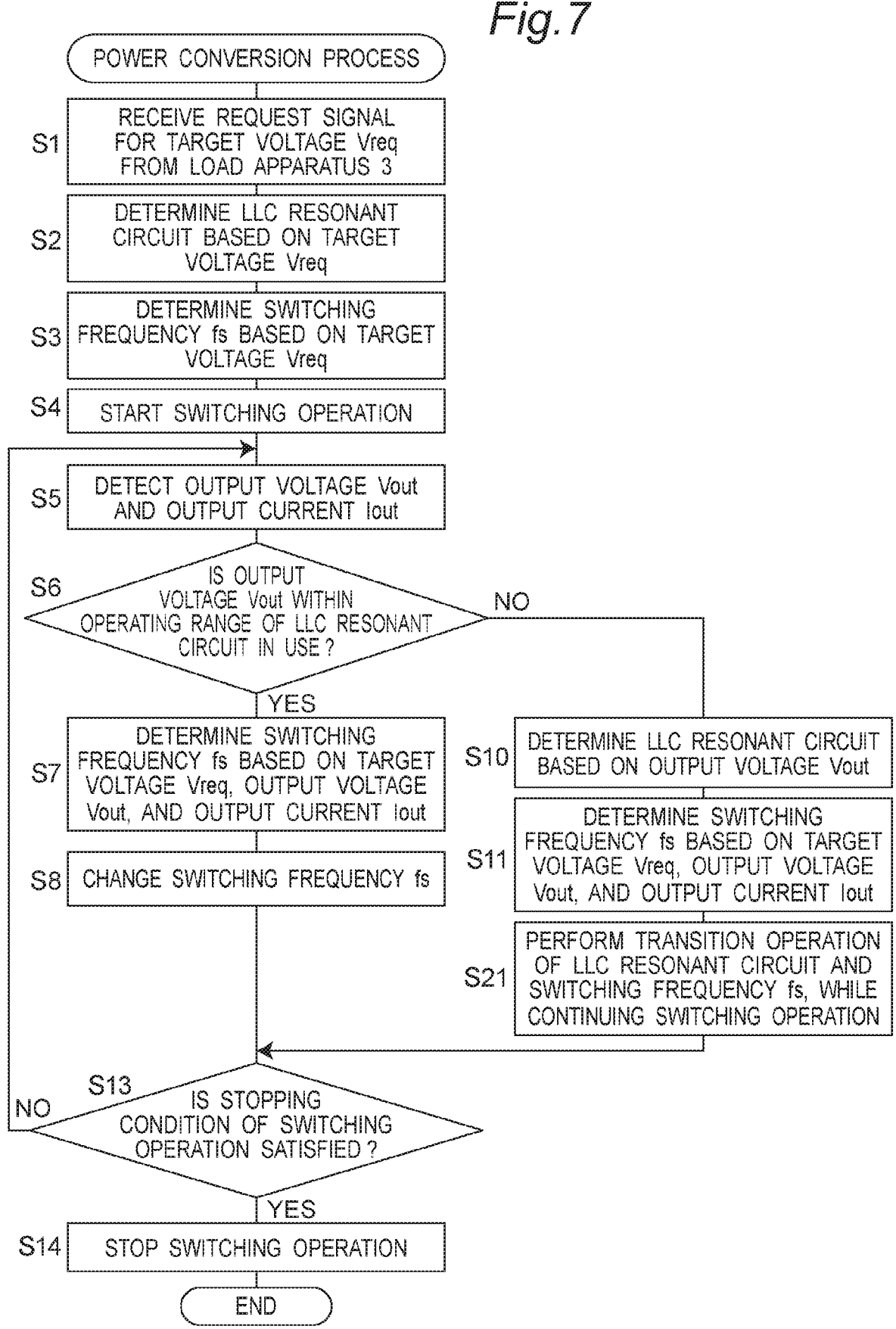
FIG. 7 is a flowchart showing a modified embodiment of power conversion process executed by the controller 15 of FIG. 1.

FIG. 7 is a flowchart showing a modified embodiment of power conversion process executed by the controller 15 of FIG. 1.

Steps S1 to S8, S13, and S14 of FIG. 7 are similar to the corresponding steps of FIG. 6. However, in Step S6 of FIG. 7, the controller 15 determines whether or not the output voltage Vout is within an operating range of the LLC resonant circuit in use; if YES, the process proceeds to Step S7, and if NO, the process proceeds to Step S10 instead of Step S9.

In Step S10, the controller 15 determines an LLC resonant circuit based on the output voltage Vout. In Step S11, the controller 15 determines a switching frequency fs based on the target voltage Vreq, the output voltage Vout, and the output current Iout. In Step S21, the controller 15 performs transition operation of the LLC resonant circuit and the switching frequency fs, while continuing the switching operation.

Next, detailed operation in Step S21 of FIG. 7 will be described with reference to FIGS. 8 to 11.

Figure 8:
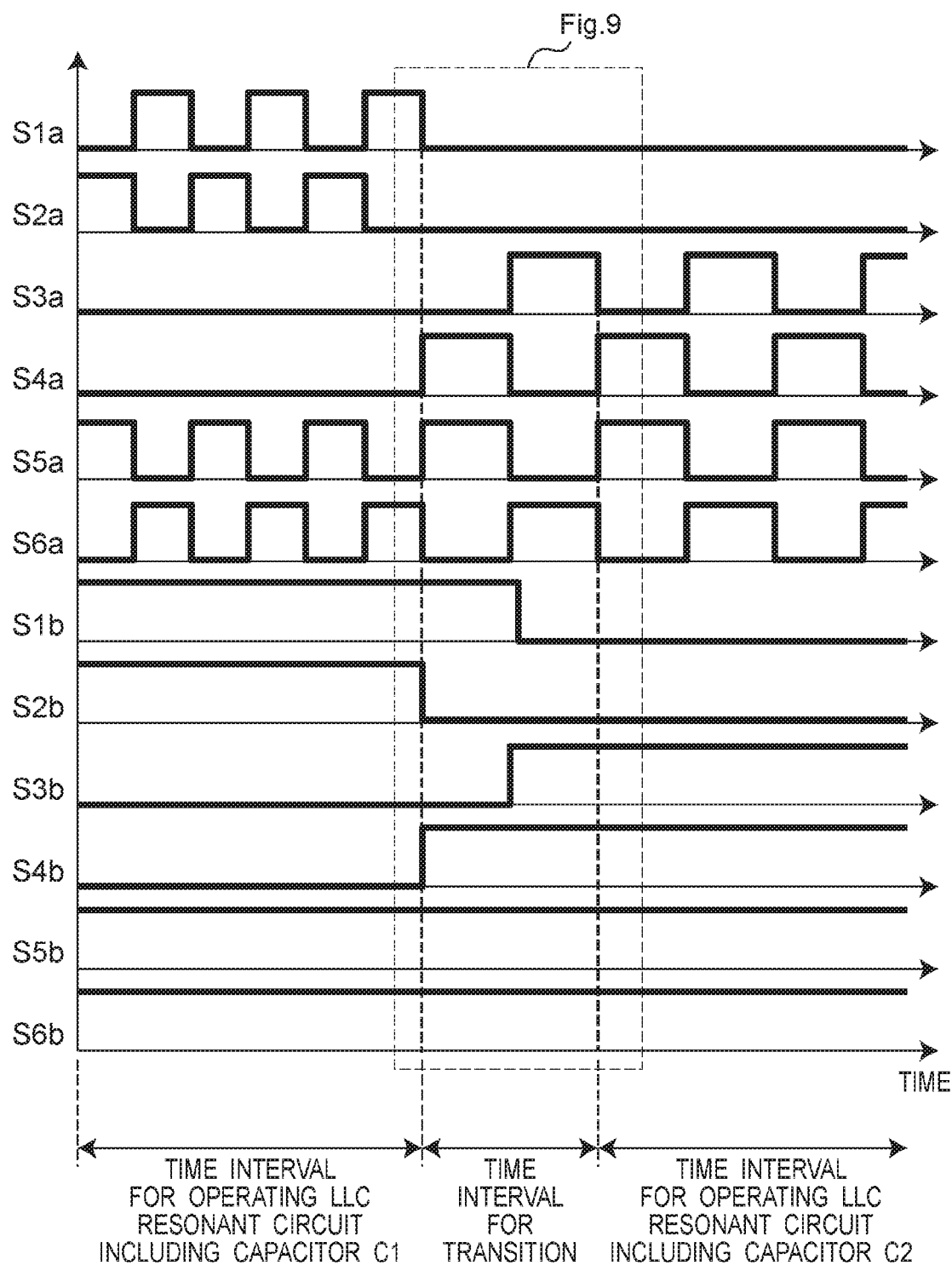
FIG. 8 is a timing chart for explaining transition from operating the LLC resonant circuit including the capacitor C1 of FIG. 1, to operating the LLC resonant circuit including the capacitor C2 of FIG. 1.

FIG. 8 is a timing chart for explaining transition from operating the LLC resonant circuit including the capacitor C1 of FIG. 1, to operating the LLC resonant circuit including the capacitor C2 of FIG. 1.

Figure 9:
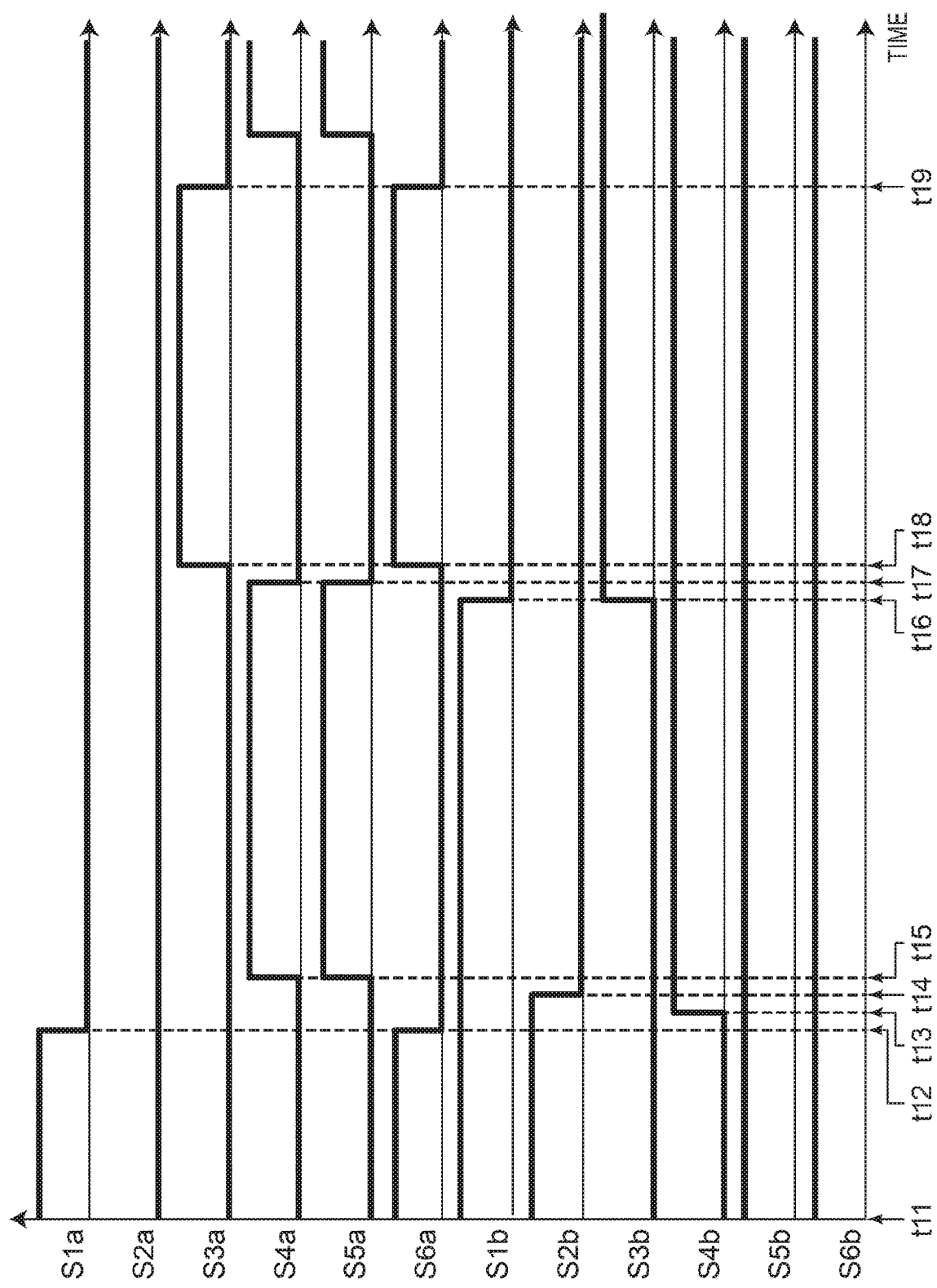
FIG. 9 is a timing chart as an enlarged view of a transition interval of FIG. 8.

FIG. 9 is a timing chart as an enlarged view of a transition interval of FIG. 8.

During a time interval from time moment t11 to t12 of FIG. 9, the switch elements S1a, S6a are turned on. At this time, a current flows through a path of "P1->S1a->C1->T1->L1->S6a->P2".

At time moment t12 of FIG. 9, the switch elements S1a, S6a are turned off, and then, a current flows through a path of "P2->S2b->C1->T1->L1->S5b->P1". During a time interval in which a negative current flows through the switch circuits SW2, SW5, the switch element S4b is turned on at time moment t13, and then, a current flows through a path of "P2->{S2b->C1; S4b->C2}->T1->L->S5b->P1". In this case, "{A->B; C->D}" indicates that a current temporarily branches into a path "A->B" and a path "C->D", and then, the branched currents join. During a time interval in which a negative current flows through the switch circuits SW2, SW4, SW5, the switch element S2b is turned off at time moment t14, and then, a current flows through a path of "P2->S4b->C2->T1->L1->S5b->P1". During a time interval in which a negative current flows through the switch circuits SW4, SW5, the switch elements S4a, S5a are turned on at time moment t15. Accordingly, the switch circuits SW4, SW5 operate so as to achieve zero voltage switching.

During a time interval from time moment t15 to t17 of FIG. 9, the switch elements S4a, S5a are turned on. At this time, a current flows through a path of "P1->S5a->L1->T1->C2->S4a->P2". During a time interval in which a positive current flows through the switch circuits SW4, SW5, at time moment t16, the switch element S1b is turned off, and the switch element S3b is turned on.

At time moment t17, the switch elements S4a, S5a are turned off, and then, a current flows through a path of "P2->S6b->L1->T1->C2->S3b->P1". During a time interval in which a negative current flows through the switch circuits SW3, SW6, the switch elements S3a, S6a are turned on at time moment t18. Accordingly, the switch circuits SW3, SW6 operate so as to achieve zero voltage switching.

During a time interval from time moment t18 to t19 of FIG. 9, the switch elements S3a, S6a are turned on. At this time, a current flows through a path of "P1->S3a->C2->T1->L1->S6a->P2". Accordingly, transition is completed from operating the LLC resonant circuit including the capacitor C1, to operating the LLC resonant circuit including the capacitor C2.

As shown in FIG. 8, the switching frequency fs may change before and after the transition interval.

The controller 15 controls the switch circuits SW1 to SW6 to perform zero voltage switching, when changing the switch circuits in the at least two first leg circuits between an operating state and an inoperative state. Accordingly, even in a case where power supply to the load apparatus 3 cannot be stopped, it is possible to perform transition operation of the LLC resonant circuit and the switching frequency fs, while continuing the switching operation.

Figure 10:
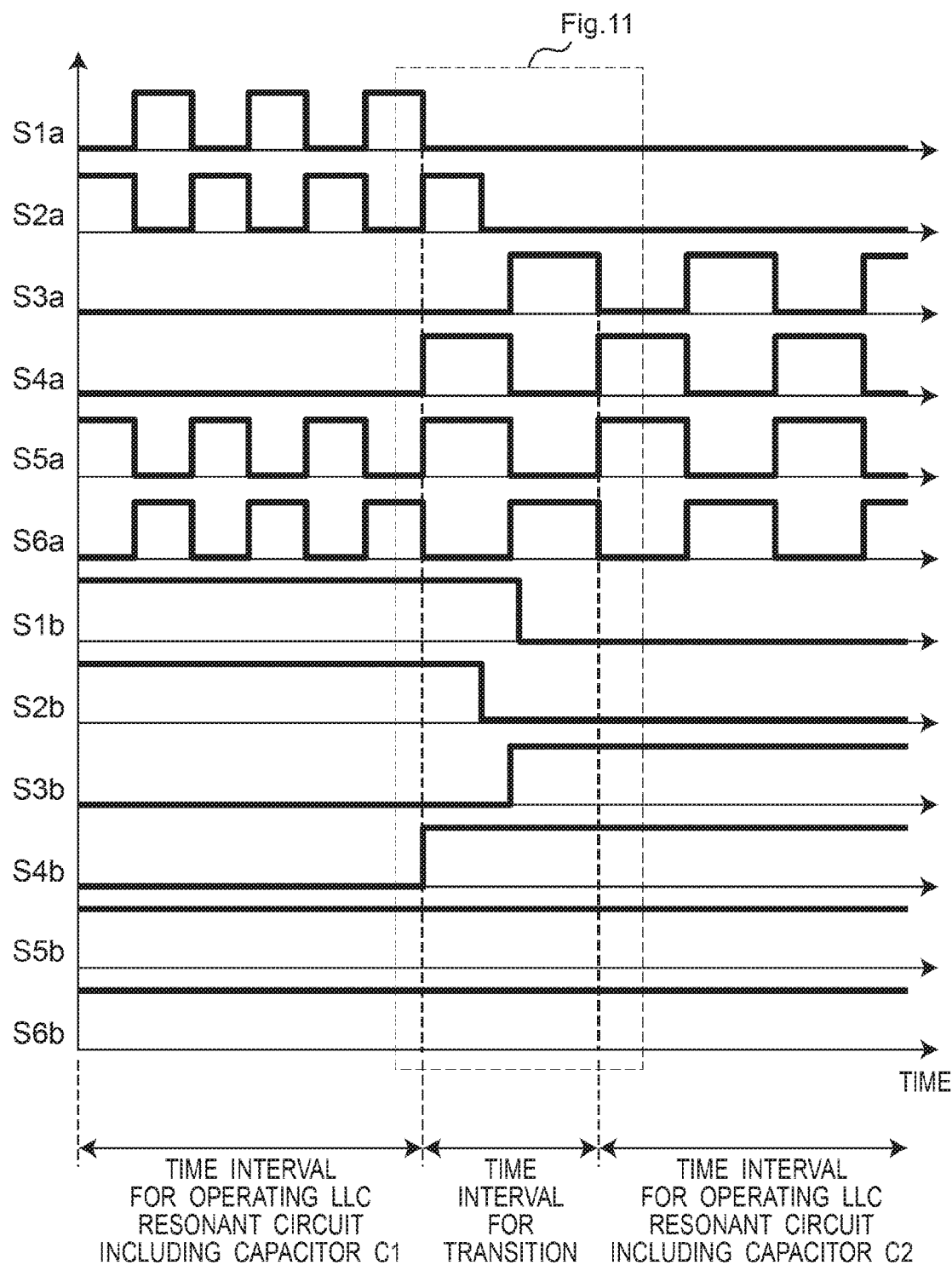
FIG. 10 is a timing chart for explaining a modified embodiment of transition from operating the LLC resonant circuit including the capacitor C1 of FIG. 1, to operating the LLC resonant circuit including the capacitor C2 of FIG. 1.

FIG. 10 is a timing chart for explaining a modified embodiment of transition from operating the LLC resonant circuit including the capacitor C1 of FIG. 1, to operating the LLC resonant circuit including the capacitor C2 of FIG. 1.

Figure 11:
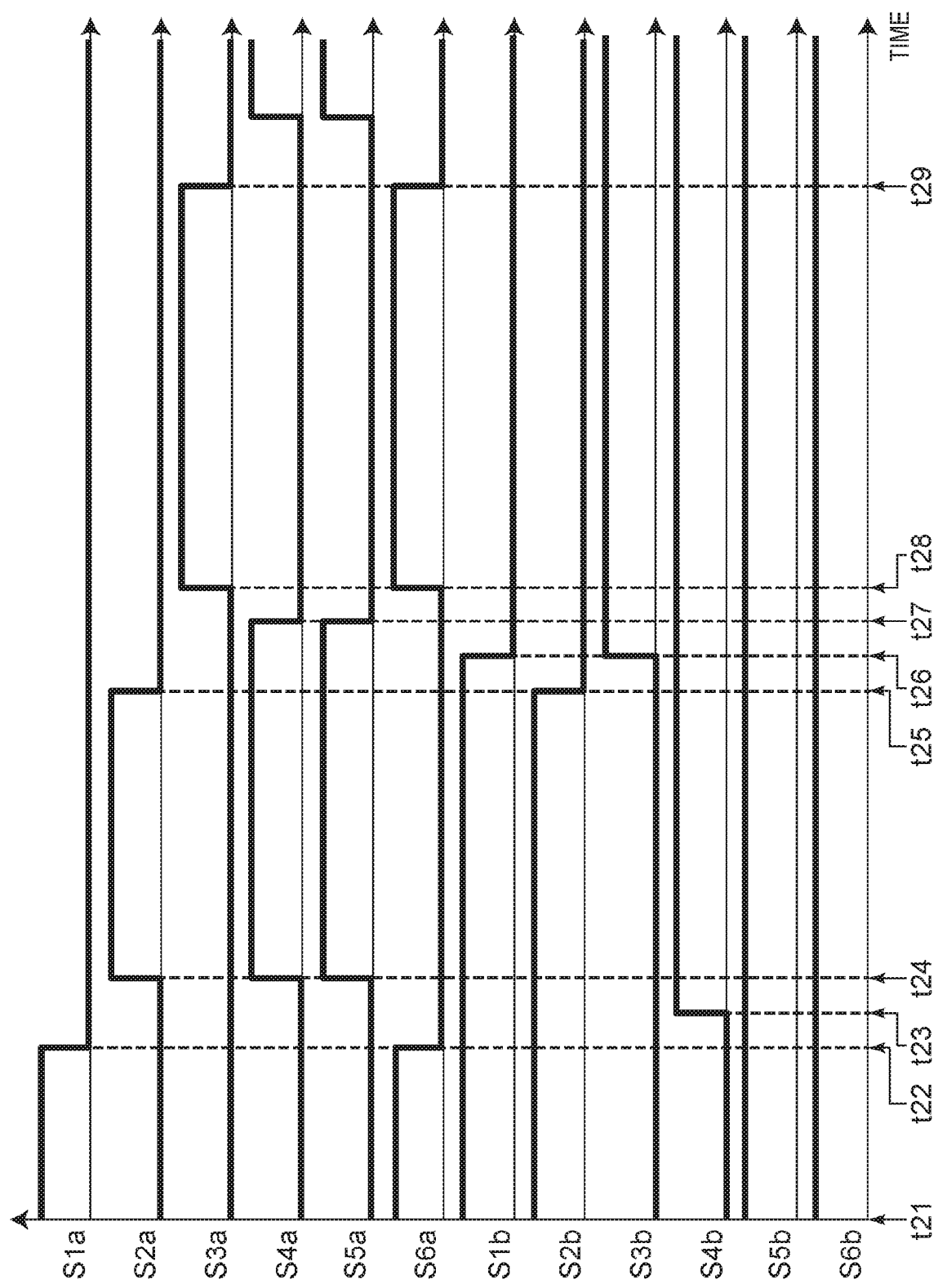
FIG. 11 is a timing chart as an enlarged view of a transition interval of FIG. 10.

FIG. 11 is a timing chart as an enlarged view of a transition interval of FIG. 10.

During a time interval from time moment t21 to t22 of FIG. 11, the switch elements S1a, S6a are turned on. At this time, a current flows through a path of "P1->S1a->C1->T1->L1->S6a->P2".

At time moment t22 of FIG. 11, the switch elements S1a, S6a are turned off, and then, a current flows through a path of "P2->S2b->C1->T->L1->S5b->P1". During a time interval in which a negative current flows through the switch circuits SW2, SW5, the switch element S4b is turned on at time moment t23, and then, a current flows through a path of "P2->{S2b->C; S4b->C2}->T1->L1->S5b->P1". During a time interval in which a negative current flows through the switch circuits SW2, SW4, SW5, the switch elements S2a, S4a, S5a are turned on at time moment t24. Accordingly, the switch circuits SW2, SW4, SW5 operate so as to achieve zero voltage switching.

During a time interval from time moment t24 to t25 of FIG. 11, the switch elements S2a, S4a, S5a are turned on. At this time, a current flows through a path of "P1->S5a->L1i->T1->{C1->S2a; C2->S4a}->P2". During a time interval in which a positive current flows through the switch circuits SW2, SW4, SW5, the switch elements S2a, S2b are turned off at time moment t25, and then, a current flows through a path of "P1->S5a->L1->T1->C2->S4a->P2". During a time interval in which a positive current flows through the switch circuits SW4, SW5, at time moment t26, the switch element S1b is turned off, and the switch element S3b is turned on.

At time moment 127, the switch elements S4a, S5a are turned off, and then, a current flows through a path of "P2->S6b->L1->T1->C2->S3b->P1", During a time interval in which a negative current flows through the switch circuits SW3, SW6, the switch elements S3a, S6a are turned on at time moment t28. Accordingly, the switch circuits SW3, SW6 operate so as to achieve zero voltage switching.

During a time interval from time moment t28 to t29 of FIG. 11, the switch elements S3a, S6a are turned on. At this time, a current flows through a path of "P1->S3a->C2->T1->L1->S6a->P2". Accordingly, transition is completed from operating the LLC resonant circuit including the capacitor C1, to operating the LLC resonant circuit including the capacitor C2.

In the above description, the controller 15 selectively operates only one of the LLC resonant circuit including the capacitor C1, and the LLC resonant circuit including the capacitor C2. However, the controller 15 may operate an LLC resonant circuit including both the capacitors C1, C2 by synchronously turning on/off the switch circuits SW1, SW3, and synchronously turning on/off the switch circuits SW2, SW4. An LLC resonant circuit having a total capacitance C1+C2 is configured by using both the capacitors C1, C2.

Figure 12:
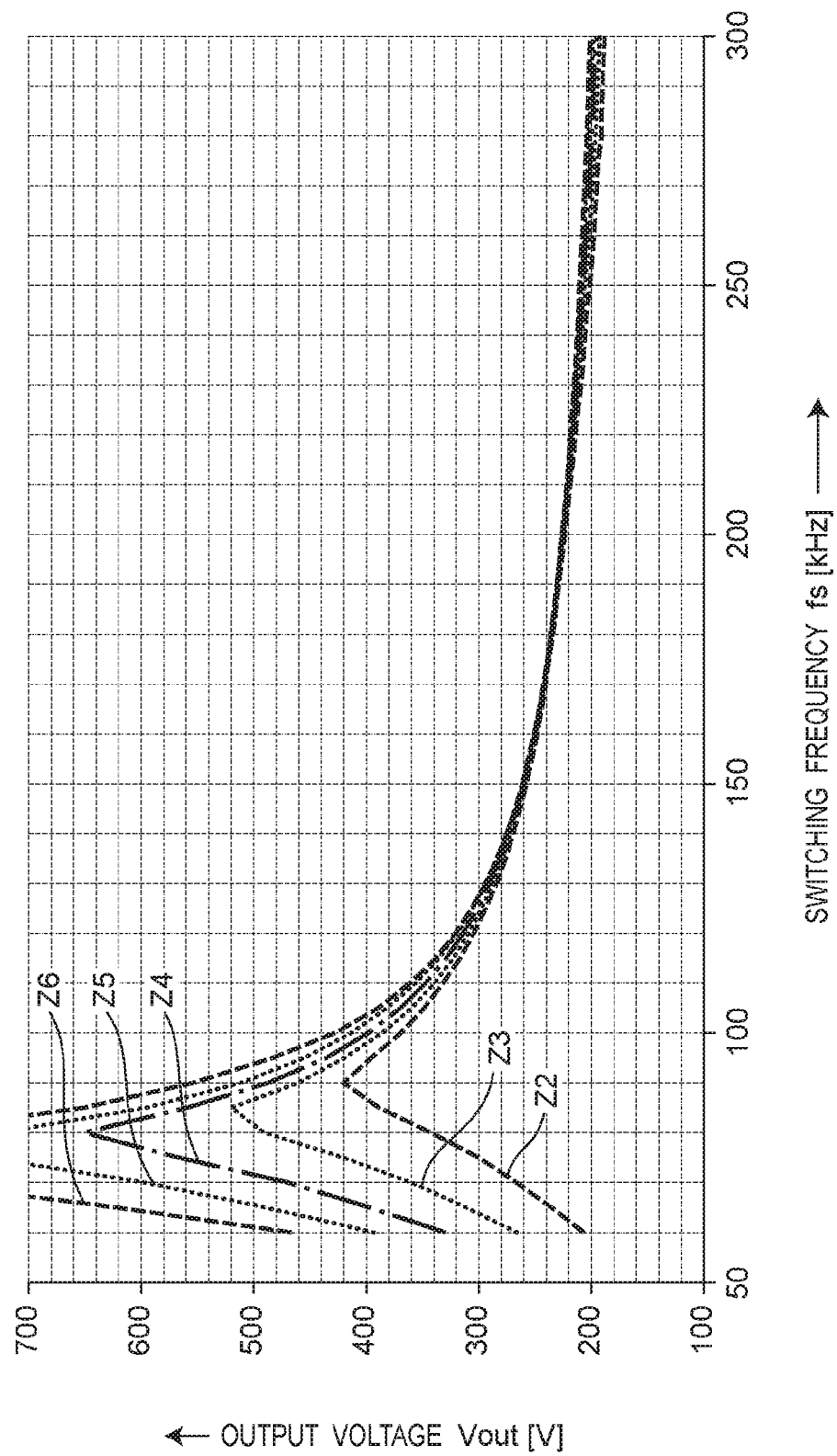
FIG. 12 is a graph showing a characteristic of output voltage Vout versus switching frequency fs of the power converter apparatus 2 in a case of operating an LLC resonant circuit including both the capacitors C1, C2 of FIG. 1.

FIG. 12 is a graph showing a characteristic of output voltage Vout versus switching frequency fs of the power converter apparatus 2 in a case of operating an LLC resonant circuit including both the capacitors C1, C2 of FIG. 1.

In FIG. 12, the following values were set.
Vin=400 V
Lp=38 µH
L1=6 µH
C1+C2'=110 F
Np:Ns=15:7

In addition, also in the case of FIG. 12, the same impedance Z2 to Z6 of the load apparatus 3 as that of FIG. 3 were set.

According to FIG. 3, FIG. 4, and FIG. 12, when the power converter apparatus 2 operates at the same switching frequency fs, in general, the output voltage Vout in a case of operating the LLC resonant circuit including the capacitors C1+C2 is lower than the output voltage Vout in the case of operating the LLC resonant circuit including only the capacitor C2. In addition, when the power converter apparatus 2 operates at the same output voltage Vout, in general, the switching frequency fs in a case of operating the LLC resonant circuit including the capacitors C1+C2 is lower than switching frequency fs in the case of operating the LLC resonant circuit including only the capacitor C2. Therefore, the power converter apparatus 2 is capable of generating a wide range of output voltage with higher efficiency than that of the prior art, by operating an LLC resonant circuit including at least one of the capacitors C1, C2.

As described above, the power converter apparatus 2 according to the first embodiment is an LLC resonant power converter apparatus capable of generating a wide range of output voltage with higher efficiency than that of the prior art.

According to the power converter apparatus 2 of the first embodiment, it is possible to avoid operating at an excessively low switching frequency fs, and operating at an excessively high switching frequency fs. Therefore, it is less likely to produce iron loss in the core and copper loss in the windings, without increasing a size of the transformer T1. In addition, because operation at an excessively high switching frequency fs is avoided, it is also less likely to produce losses in the switch elements S1a to S6b.

In an LLC resonant power converter apparatus, in a case where the input voltage and the output voltage are of several hundreds V, a voltage of several kV (peak-to-peak) may be applied to a capacitor of an LLC resonant circuit, and to a transformer. The power converter apparatus 2 according to the first embodiment uses the leg circuit including the switch circuits SW1, SW2, and the leg circuit including the switch circuits SW3, SW4, to selectively operate the LLC resonant circuit including the capacitor C1, and the LLC resonant circuit including the capacitor C2. Accordingly, it is possible to easily achieve withstand voltage performance required for switches for the capacitors C1, C2.

The power converter apparatus 2 according to the first embodiment is provided with the switch circuits SW1 to SW6 that selectively change among a state where a current flows in the first direction, a state where a current flows in the second direction, and a state where no current flows in the first direction nor in the second direction. Accordingly, when one of the switch circuits is turned off, for example, no current flows through body diodes of switch elements unlike the prior art, and it is less likely to interrupt switching operation.

For example, in a case where the load apparatus 3 is a charging apparatus, it is necessary to increase a voltage supplied to the load apparatus 3, because an internal voltage of the load apparatus 3 increases as time elapses from a start of charging. The power converter apparatus 2 according to the first embodiment can follow such a change of a state of the load apparatus 3, and change the output voltage Vout.

Next, power converter apparatuses according to modified embodiments of the first embodiment will be described.

Figure 13:
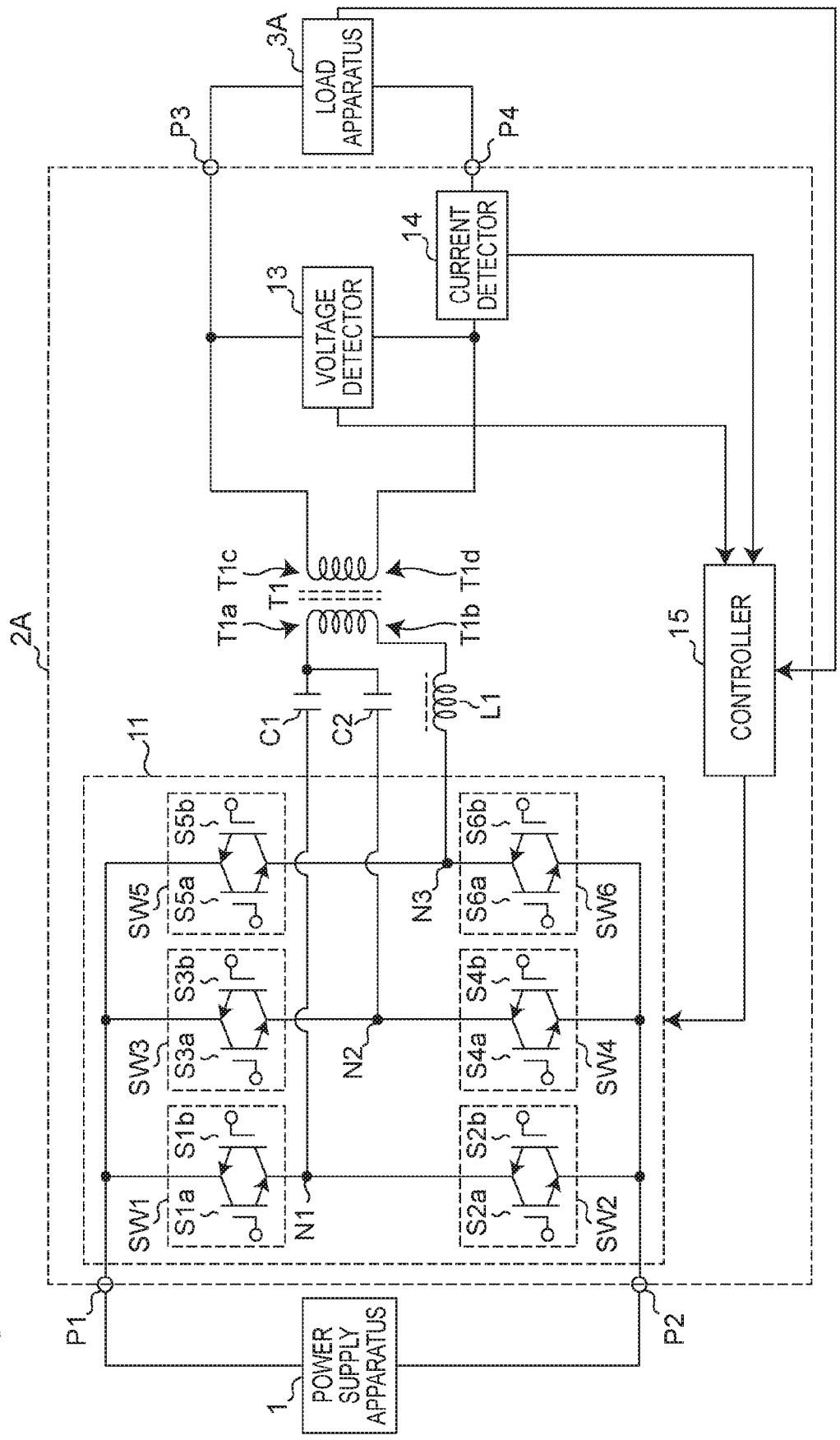
FIG. 13 is a block diagram showing a configuration of a power converter apparatus 2A according to a first modified embodiment of the first embodiment.

FIG. 13 is a block diagram showing a configuration of a power converter apparatus 2A according to a first modified embodiment of the first embodiment. The power converter apparatus 2A may supply output power to a load apparatus 3A for alternating current, instead of the load apparatus 3 for direct current of FIG. 1. The power converter apparatus 2A of FIG. 13 is configured without the diode bridge 12 and the capacitor C10 of the power converter apparatus 2 of FIG. 1. Also in this case, it is possible to achieve advantageous effects similar to those of the power converter apparatus 2 of FIG. 1.

Figure 14:
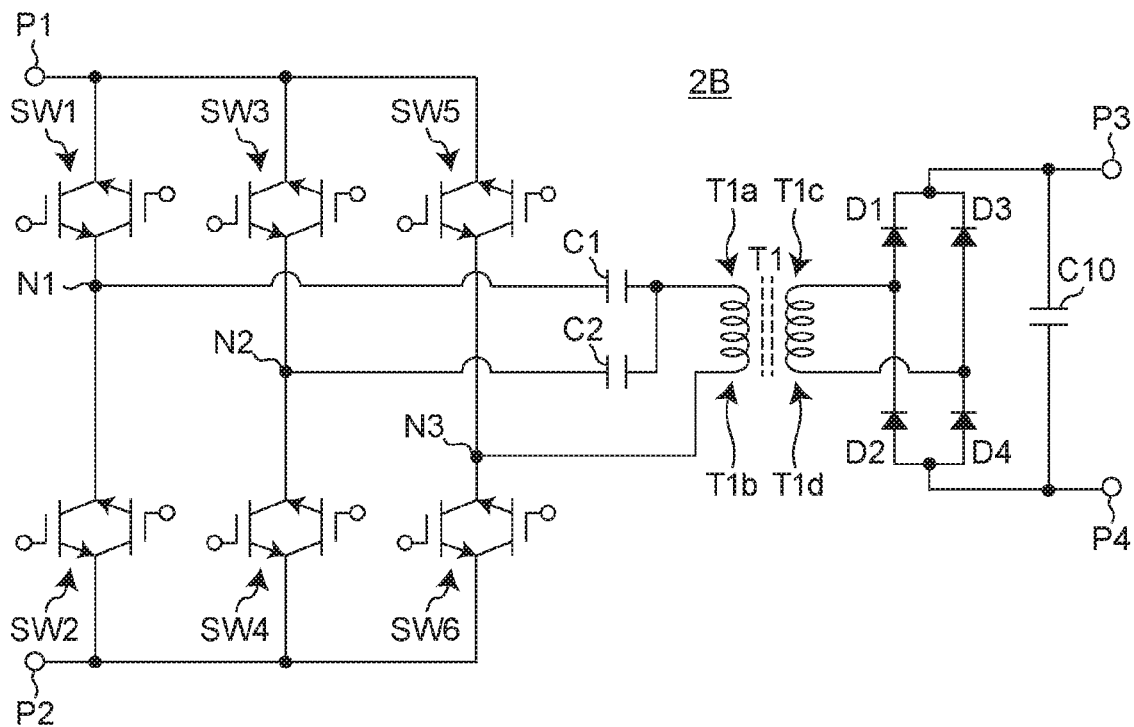
FIG. 14 is a block diagram showing a configuration of a power converter apparatus 2B according to a second modified embodiment of the first embodiment.

FIG. 14 is a block diagram showing a configuration of a power converter apparatus 2B according to a second modified embodiment of the first embodiment. The power converter apparatus 2B of FIG. 14 is configured without the inductor L1 of the power converter apparatus 2 of FIG. 1. In FIGS. 14 to 27, the voltage detector 13, the current detector 14, and the controller 15 of FIG. 1 are omitted for ease of illustration. Because the primary winding of the transformer T1 has inductance (leakage inductance), the primary winding of the transformer T1 and the capacitor C1 of FIG. 14 substantially operate as an LLC resonant circuit even when the inductor L1 of FIG. 1 is removed. Similarly, the primary winding of the transformer T1 and the capacitor C2 also substantially operate as an LLC resonant circuit. Also in this case, it is possible to achieve advantageous effects similar to those of the power converter apparatus 2 of FIG. 1.

Figure 15:
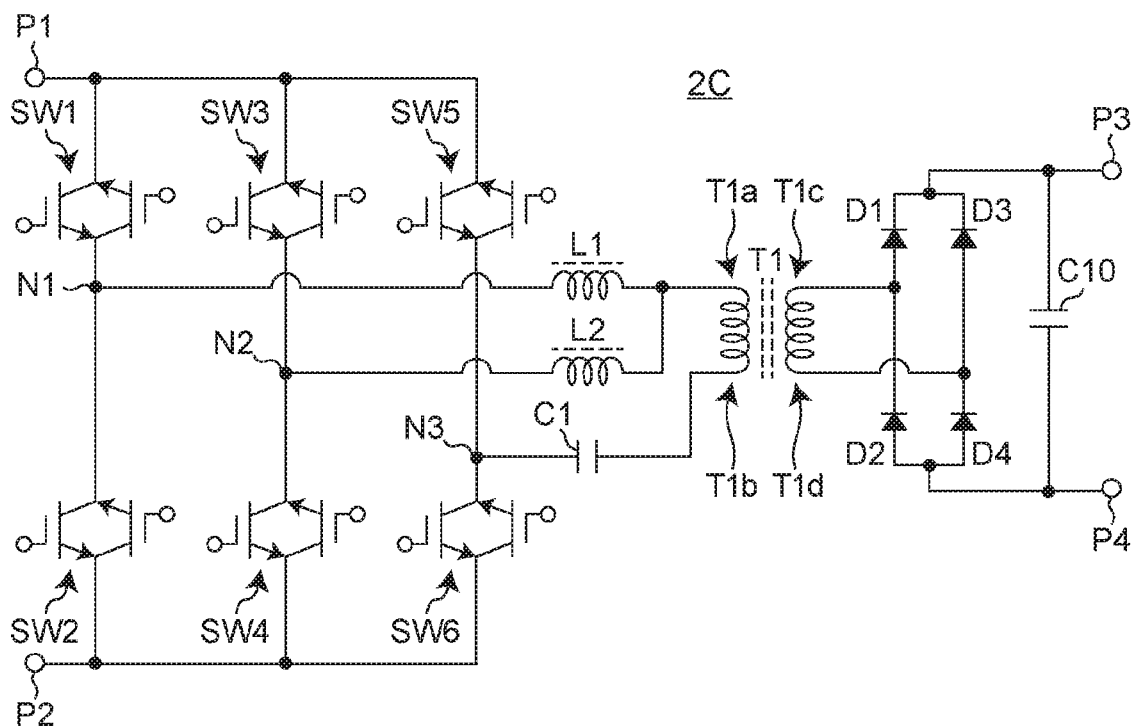
FIG. 15 is a block diagram showing a configuration of a power converter apparatus 2C according to a third modified embodiment of the first embodiment.

FIG. 15 is a block diagram showing a configuration of a power converter apparatus 2C according to a third modified embodiment of the first embodiment. The terminal T1a of the primary winding of the transformer T1 may be connected to at least two nodes in at least two first leg circuits among the plurality of leg circuits via at least two first circuit portions, respectively, each of the at least two nodes being disposed between the two switch circuits in one of the at least two first leg circuits, the at least two first circuit portions having different inductances from each other. In the power converter apparatus 2C of FIG. 15, the terminal T1a of the primary winding of the transformer T1 is connected to the node N1 between the switch circuits SW1, SW2 via the inductor L. The terminal T1a of the primary winding of the transformer T1 is further connected to the node N2 between the switch circuits SW3, SW4 via an inductor L2 having inductance different from inductance of the inductor L1. The terminal T1b of the primary winding of the transformer T is connected to the node N3 between the switch circuits SW5, SW6 via the capacitor C1. Also in this case, it is possible to achieve advantageous effects similar to those of the power converter apparatus 2 of FIG. 1.

Figure 16:
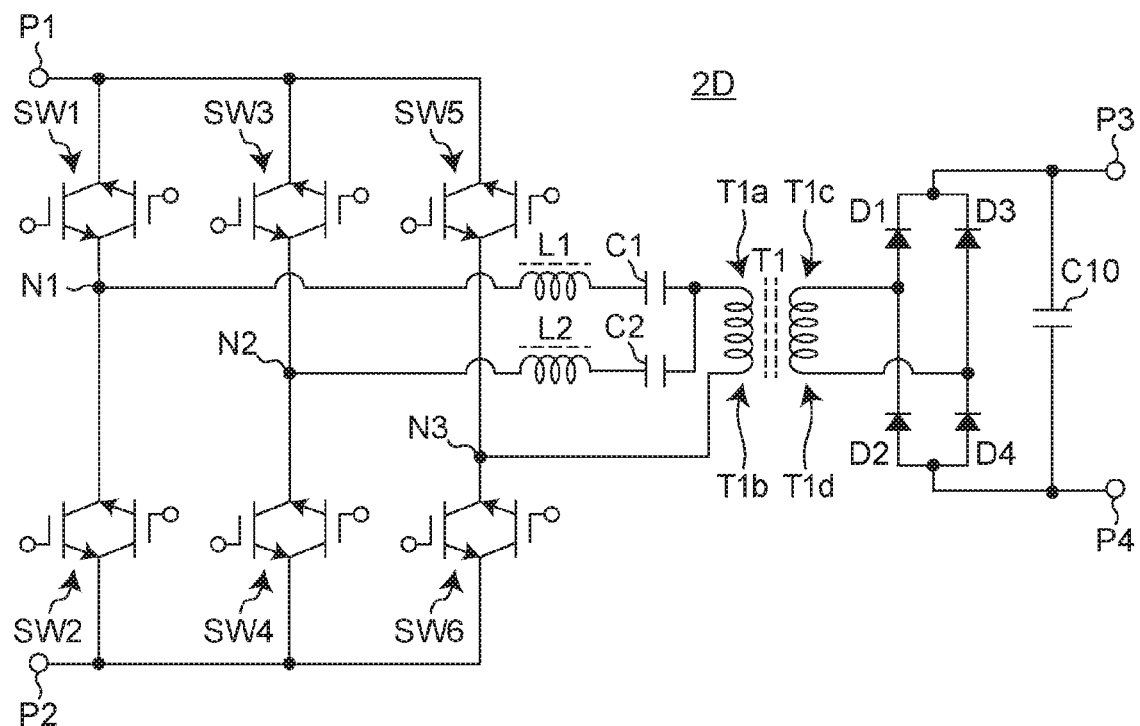
FIG. 16 is a block diagram showing a configuration of a power converter apparatus 2D according to a fourth modified embodiment of the first embodiment.

FIG. 16 is a block diagram showing a configuration of a power converter apparatus 2D according to a fourth modified embodiment of the first embodiment. The terminal T1a of the primary winding of the transformer T1 may be connected to at least two nodes in at least two first leg circuits among the plurality of leg circuits via at least two first circuit portions, respectively, each of the at least two nodes being disposed between the two switch circuits in one of the at least two first leg circuits, at least one of capacitances and inductances being different in the at least two first circuit portions. In the power converter apparatus 2D of FIG. 16, the terminal T1a of the primary winding of the transformer T1 is connected to the node N1 between the switch circuits SW1, SW2 via the capacitor C1 and the inductor L1. The terminal T1a of the primary winding of the transformer T1 is further connected to the node N2 between the switch circuits SW3, SW4 via the capacitor C2 and the inductor L2 having capacitance and inductance different from at least one of capacitance of the capacitor C1 and inductance of the inductor L1. The terminal T1b of the primary winding of the transformer T1 is connected to the node N3 between the switch circuits SW5, SW6. Also in this case, it is possible to achieve advantageous effects similar to those of the power converter apparatus 2 of FIG. 1.

Herein, the term "different capacitances" includes a case of zero capacitance, that is, a case where only one of the two first circuit portions includes a capacitor, and the other does not include a capacitor. Similarly, the term "different inductances" includes a case of zero inductance, that is, a case where only one of the two first circuit portions includes an inductor, and the other does not include an inductor.

Figure 17:
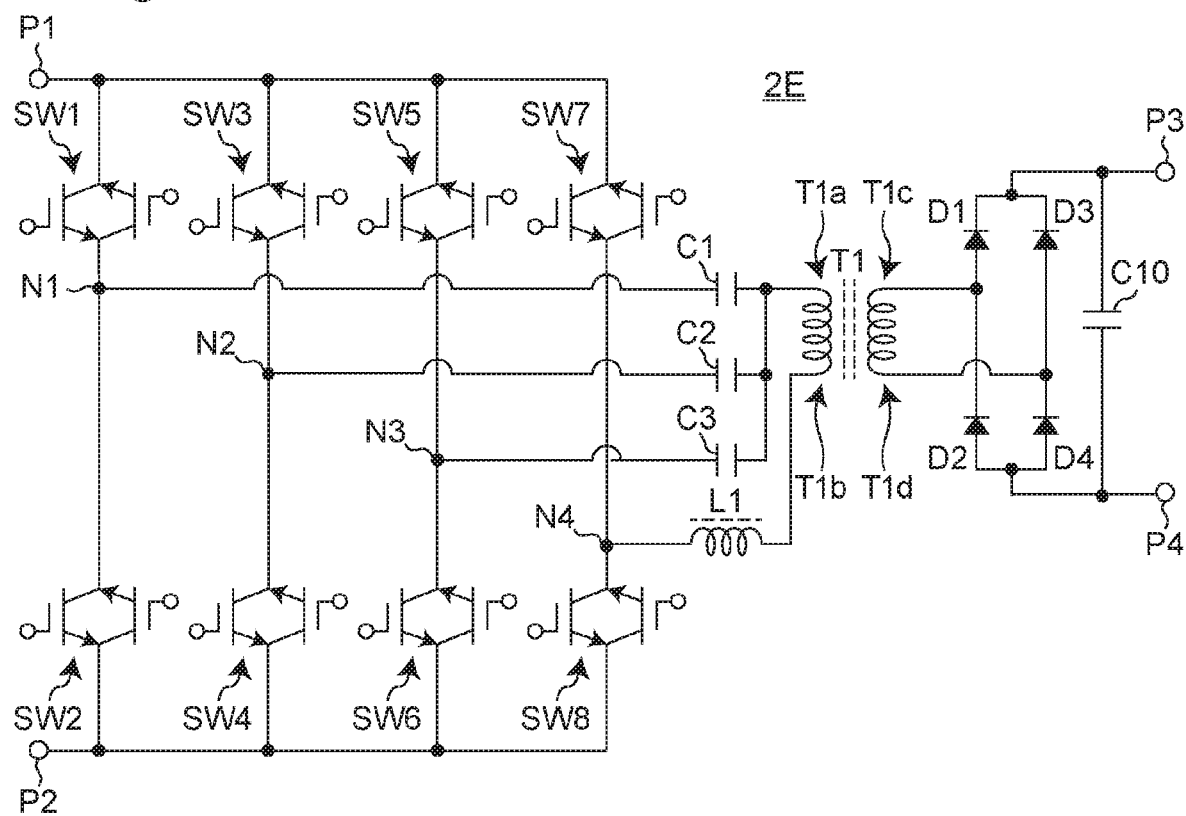
FIG. 17 is a block diagram showing a configuration of a power converter apparatus 2E according to a fifth modified embodiment of the first embodiment.

FIG. 17 is a block diagram showing a configuration of a power converter apparatus 2E according to a fifth modified embodiment of the first embodiment. The power converter apparatus may include four or more leg circuits. The power converter apparatus 2E of FIG. 17 is provided with the components of the power converter apparatus 2 of FIG. 1, and further provided with a leg circuit including switch circuits SW7, SW8, and a capacitor C3. The terminal T1a of the primary winding of the transformer T1 is connected to the node N3 between the switch circuits SW5, SW6 via the capacitor C3. The terminal T1b of the primary winding of the transformer T1 is connected to a node N4 between the switch circuits SW7, SW8 via the inductor L1, instead of connected to the node N3. The power converter apparatus 2E of FIG. 17 can change a characteristic of output voltage Vout versus switching frequency fs of the power converter apparatus 2E with higher accuracy than that of FIG. 1.

Figure 18:
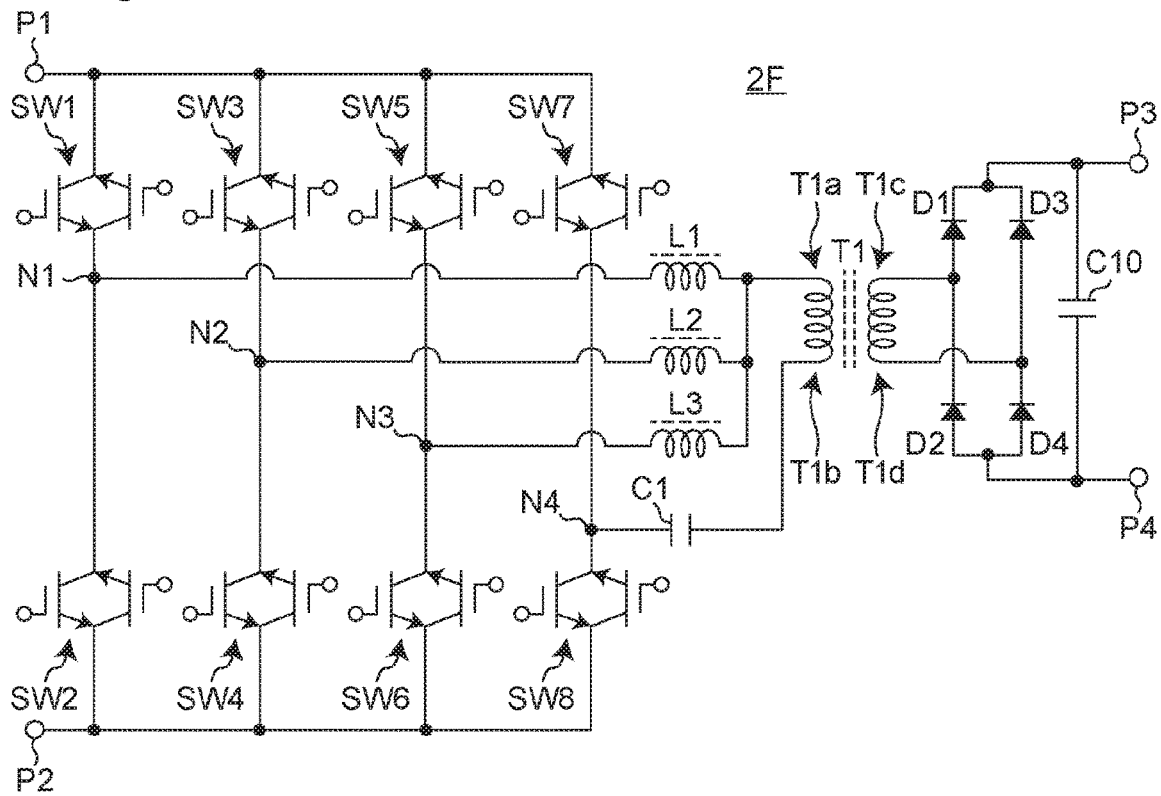
FIG. 18 is a block diagram showing a configuration of a power converter apparatus 2F according to a sixth modified embodiment of the first embodiment.

FIG. 18 is a block diagram showing a configuration of a power converter apparatus 2F according to a sixth modified embodiment of the first embodiment. In the power converter apparatus 2F of FIG. 18, the terminal T1a of the primary winding of the transformer T1 is connected to the node N1 between the switch circuits SW1, SW2 via the inductor L1. The terminal T1a of the primary winding of the transformer T1 is further connected to the node N2 between the switch circuits SW3, SW4 via the inductor L2 having inductance different from inductance of the inductor L1. The terminal T1a of the primary winding of the transformer T1 is further connected to the node N3 between the switch circuits SW5, SW6 via an inductor L3 having inductance different from inductances of the inductors L1, L2. The terminal T1b of the primary winding of the transformer T1 is connected to the node N4 between the switch circuits SW7, SW8 via the capacitor C1. Also in this case, it is possible to achieve advantageous effects similar to those of the power converter apparatus 2E of FIG. 17.

Figure 19:
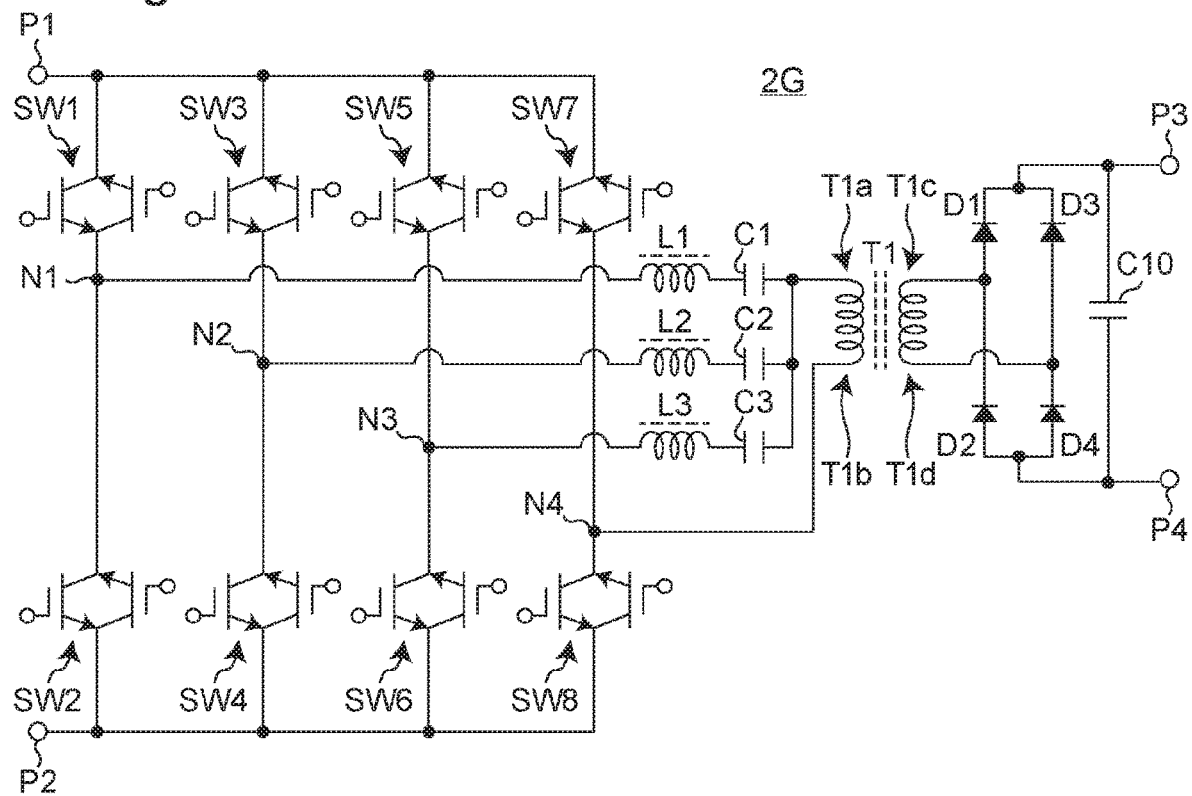
FIG. 19 is a block diagram showing a configuration of a power converter apparatus 2G according to a seventh modified embodiment of the first embodiment.

FIG. 19 is a block diagram showing a configuration of a power converter apparatus 2G according to a seventh modified embodiment of the first embodiment. In the power converter apparatus 2G of FIG. 19, the terminal T1a of the primary winding of the transformer T1 is connected to the node N1 between the switch circuits SW1, SW2 via the capacitor C1 and the inductor L1. The terminal T1a of the primary winding of the transformer T1 is further connected to the node N2 between the switch circuits SW3, SW4 via the capacitor C2 and the inductor L2 having capacitance and inductance different from at least one of capacitance of the capacitor C1 and inductance of the inductor L1. The terminal T1a of the primary winding of the transformer T1 is further connected to the node N3 between the switch circuits SW5, SW6 via the capacitor C3 and the inductor L3 having capacitance and inductance different from at least one of capacitances of the capacitors C1, C2 and inductances of the inductors L1, L2. The terminal T1b of the primary winding of the transformer T1 is connected to the node N4 between the switch circuits SW7, SW8. Also in this case, it is possible to achieve advantageous effects similar to those of the power converter apparatus 2E of FIG. 17.

Figure 20:
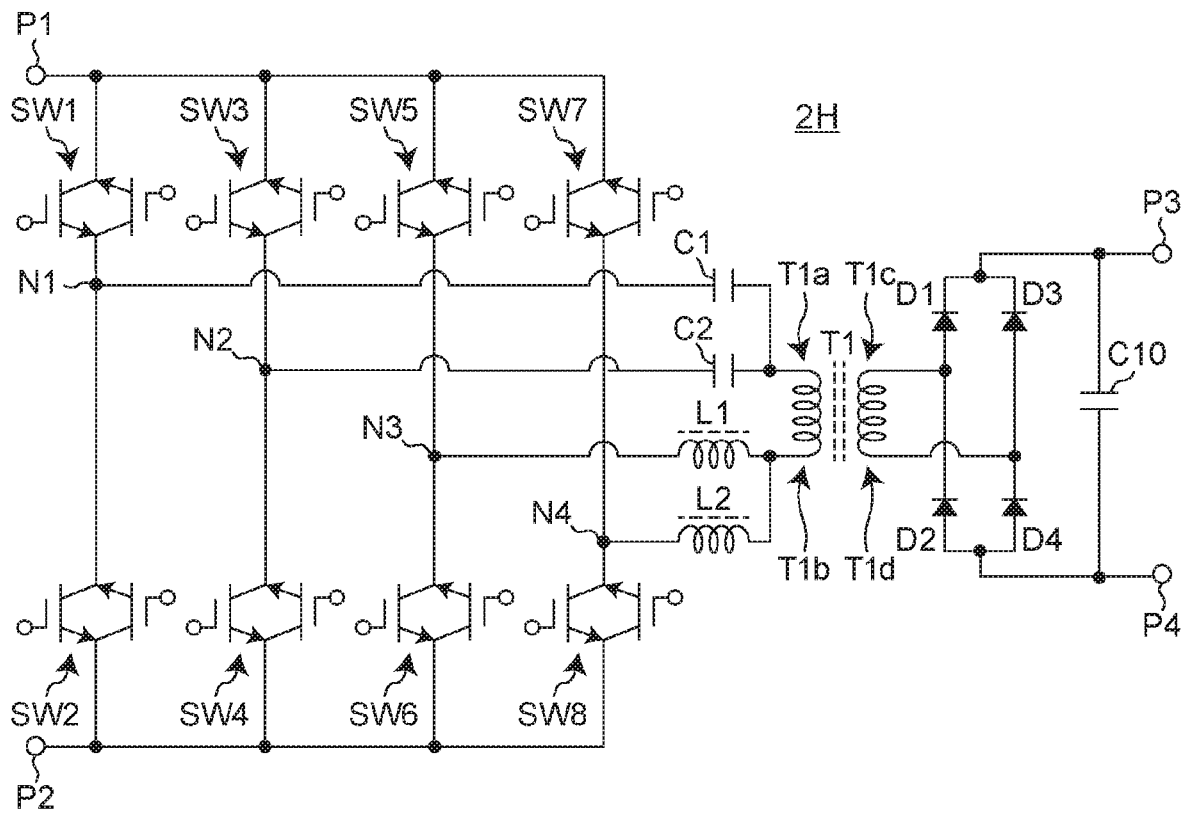
FIG. 20 is a block diagram showing a configuration of a power converter apparatus 2H according to an eighth modified embodiment of the first embodiment.

FIG. 20 is a block diagram showing a configuration of a power converter apparatus 2H according to an eighth modified embodiment of the first embodiment. The terminal T1b of the primary winding of the transformer T1 may also be connected to at least two nodes in at least two first leg circuits among the plurality of leg circuits via at least two first circuit portions, respectively, each of the at least two nodes being disposed between the two switch circuits in one of the at least two first leg circuits, at least one of capacitances and inductances being different in the at least two first circuit portions. In the power converter apparatus 2H of FIG. 20, the terminal T1a of the primary winding of the transformer T1 is connected to the node N1 between the switch circuits SW1, SW2 via the capacitor C1. The terminal T1a of the primary winding of the transformer T1 is further connected to the node N2 between the switch circuits SW3, SW4 via the capacitor C2 having capacitance different from capacitance of the capacitor C1. The terminal T1b of the primary winding of the transformer T1 is connected to the node N3 between the switch circuits SW5, SW6 via the inductor L3. The terminal T1b of the primary winding of the transformer T1 is further connected to the node N4 between the switch circuits SW7, SW8 via the inductor L2 having inductance different from inductance of the inductor L1. The power converter apparatus 2H of FIG. 20 can change a characteristic of output voltage Vout versus switching frequency fs of the power converter apparatus 2H with higher accuracy than that of FIG. 1.

In the present disclosure, at least two leg circuits connected to the same terminal T1b (the leg circuit including the switch circuits SW5, SW6 and the leg circuit including the switch circuits SW7, SW8) are also referred to as "second leg circuits". In addition, in the present disclosure, at least two circuit portions (inductors L1, L2 in the example of FIG. 20) are also referred to as a "second circuit portion", the at least two circuit portions being connected between the terminal T1b and each of the nodes N3, N4, each of the nodes N3, N4 being disposed between the two switch circuits in one of the second leg circuits, and at least one of capacitances and inductances being different in the at least two circuit portions.

Second Embodiment

In the first embodiment, the power converter apparatuses provided with the plurality of switch circuits configured as a full bridge circuit are described. In a second embodiment, power converter apparatuses provided with a plurality of switch circuits configured as a half bridge circuit will be described.

Figure 21:
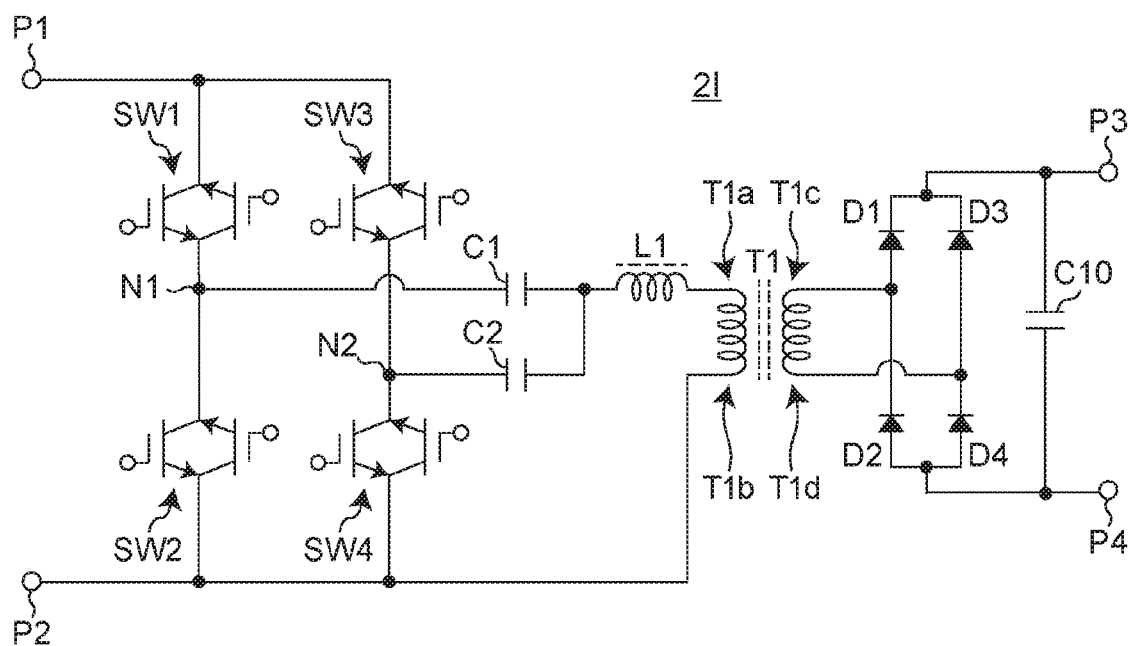
FIG. 21 is a block diagram showing a configuration of a power converter apparatus 2I according to a second embodiment.

FIG. 21 is a block diagram showing a configuration of a power converter apparatus 2I according to the second embodiment. The power converter apparatus 2I of FIG. 21 is configured without the switch circuits SW5, SW6 of the power converter apparatus 2 of FIG. 1. The inductor L1 is connected between the terminal T1a of the primary winding of the transformer T1 and the capacitors C1, C2. The terminal T1b of the primary winding of the transformer T1 is connected to the input terminal P1 or P2 (input terminal P2 in the example of FIG. 21).

Also in this case, the power converter apparatus according to the present embodiment is an LLC resonant power converter apparatus capable of generating a wide range of output voltage with higher efficiency than that of the prior art, in a manner similar to that of the power converter apparatus according to the first embodiment.

Figure 22:
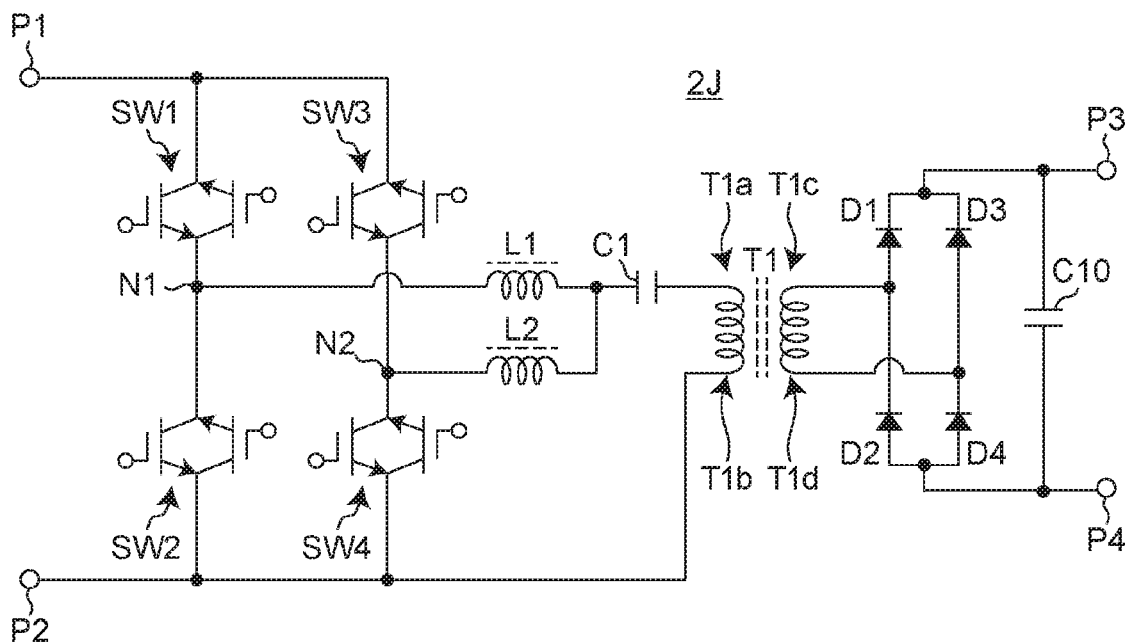
FIG. 22 is a block diagram showing a configuration of a power converter apparatus 2J according to a first modified embodiment of the second embodiment.

FIG. 22 is a block diagram showing a configuration of a power converter apparatus 2J according to a first modified embodiment of the second embodiment. The power converter apparatus 2J of FIG. 22 is configured without the switch circuits SW5, SW6 of the power converter apparatus 2C of FIG. 15. The capacitor C1 is connected between the terminal T1a of the primary winding of the transformer T1 and the inductors L1, L2. The terminal T1b of the primary winding of the transformer T1 is connected to the input terminal P1 or P2 (input terminal P2 in the example of FIG. 22). Also in this case, it is possible to achieve advantageous effects similar to those of the power converter apparatus 2I of FIG. 21.

Figure 23:
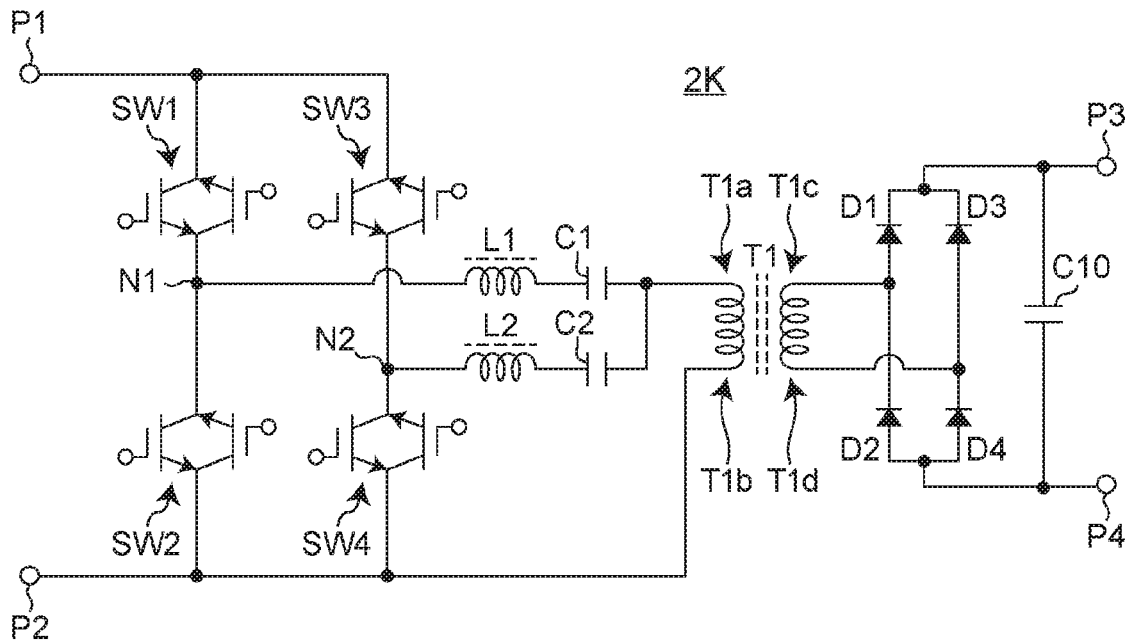
FIG. 23 is a block diagram showing a configuration of a power converter apparatus 2K according to a second modified embodiment of the second embodiment.

FIG. 23 is a block diagram showing a configuration of a power converter apparatus 2K according to a second modified embodiment of the second embodiment. The power converter apparatus 2K of FIG. 23 is configured without the switch circuits SW5, SW6 of the power converter apparatus 2D of FIG. 16. The terminal T1b of the primary winding of the transformer T1 is connected to the input terminal P1 or P2 (input terminal P2 in the example of FIG. 23). Also in this case, it is possible to achieve advantageous effects similar to those of the power converter apparatus 2I of FIG. 21.

Third Embodiment

Figure 24:
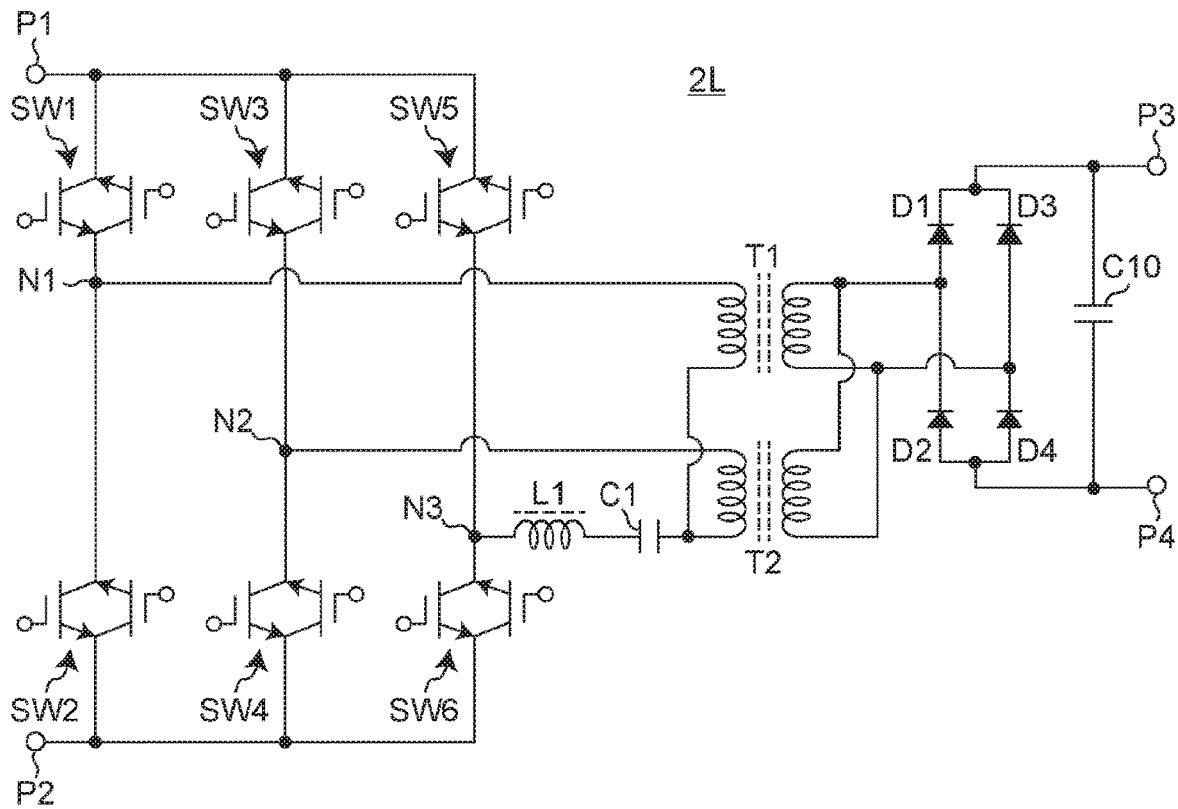
FIG. 24 is a block diagram showing a configuration of a power converter apparatus 2L according to a third embodiment.

FIG. 24 is a block diagram showing a configuration of a power converter apparatus 2L according to a third embodiment. The power converter apparatus 2L of FIG. 24 is provided with the components of the power converter apparatus 2 of FIG. 1, and further provided with a transformer T2. Primary windings of the transformers T1, T2 have inductances different from each other, and secondary windings of the transformers T1, T2 are connected in parallel with each other. The primary windings of the transformers T1, T2 are connected to at least two nodes in at least two first leg circuits among the plurality of leg circuits, respectively, each of the at least two nodes being disposed between the two switch circuits in one of the at least two first leg circuits. In the example of FIG. 24, one end of the primary winding of the transformer T1 is connected to the node N1 between the switch circuits SW1, SW2. In addition, one end of the primary winding of the transformer T2 is connected to the node N2 between the switch circuits SW3, SW4. In addition, the other ends of the primary windings of the transformers T1, T2 are connected to the node N3 between the switch circuits SW5, SW6 via a capacitor C1 and an inductor L1. Also in this case, the power converter apparatus according to the present embodiment is an LLC resonant power converter apparatus capable of generating a wide range of output voltage with higher efficiency than that of the prior art, in a manner similar to that of the power converter apparatus according to the first embodiment.

Figure 25:
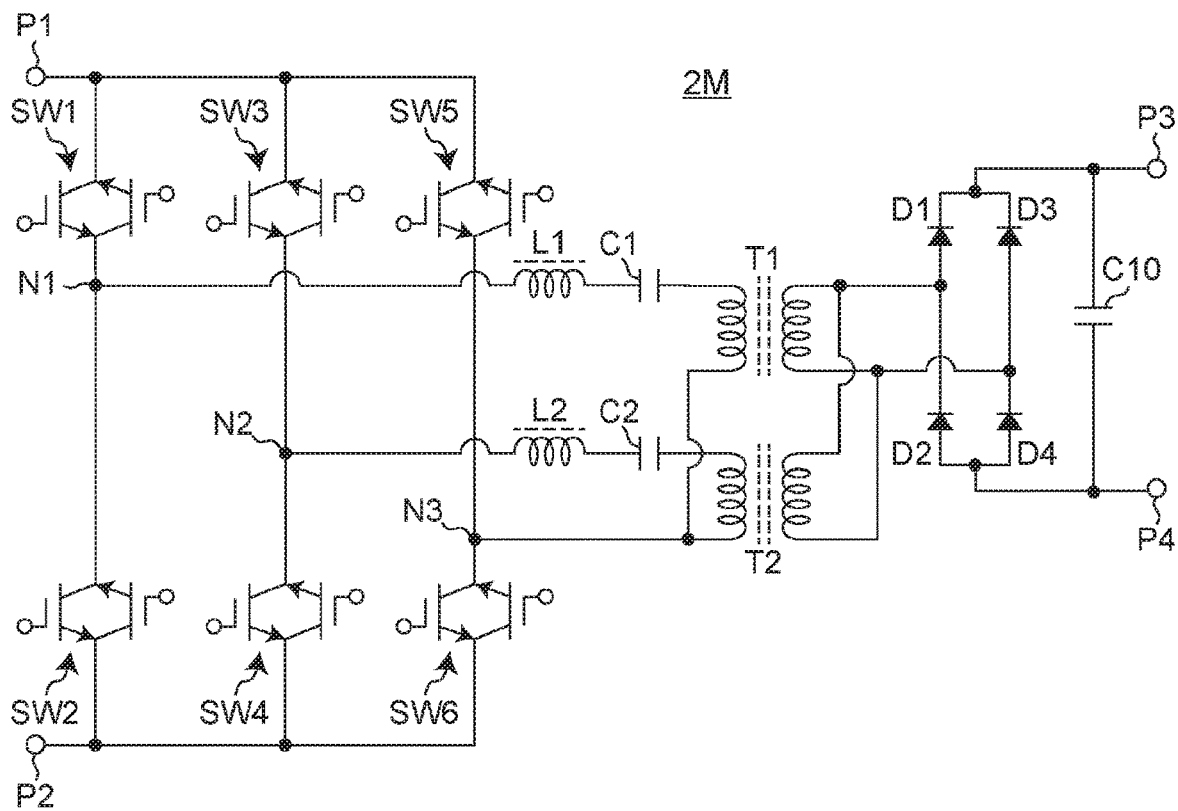
FIG. 25 is a block diagram showing a configuration of a power converter apparatus 2M according to a first modified embodiment of the third embodiment.

FIG. 25 is a block diagram showing a configuration of a power converter apparatus 2M according to a first modified embodiment of the third embodiment. In the power converter apparatus 2M of FIG. 25, one end of the primary winding of the transformer T1 is connected to the node N1 between the switch circuits SW1, SW2 via the capacitor C1 and the inductor L1. In addition, one end of the primary winding of the transformer T2 is connected to the node N2 between the switch circuits SW3, SW4 via a capacitor C2 and an inductor L2 having capacitance and inductance different from at least one of capacitance of the capacitor C1 and inductance of the inductor L1. In addition, the other ends of the primary windings of the transformers T1, T2 are connected to the node N3 between the switch circuits SW5, SW6. Also in this case, it is possible to achieve advantageous effects similar to those of the power converter apparatus 2L of FIG. 24.

Figure 26:
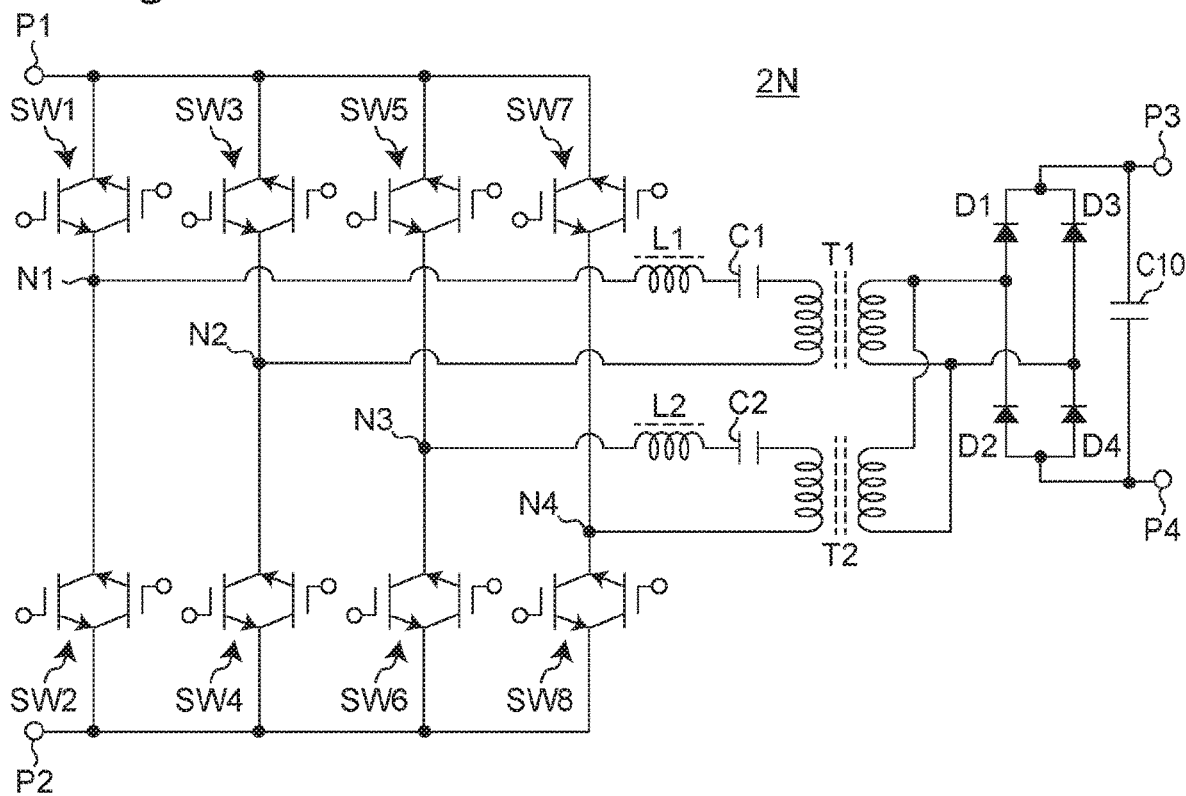
FIG. 26 is a block diagram showing a configuration of a power converter apparatus 2N according to a second modified embodiment of the third embodiment.

FIG. 26 is a block diagram showing a configuration of a power converter apparatus 2N according to a second modified embodiment of the third embodiment. In the power converter apparatus 2N of FIG. 26, one end of the primary winding of the transformer T1 is connected to the node N1 between the switch circuits SW1, SW2 via the capacitor C1 and the inductor L1. In addition, the other end of the primary winding of the transformer T1 is connected to the node N2 between the switch circuits SW3, SW4. In addition, one end of the primary winding of the transformer T2 is connected to the node N3 between the switch circuits SW5, SW6 via the capacitor C2 and the inductor L2 having capacitance and inductance different from at least one of capacitance of the capacitor C1 and inductance of the inductor L1. In addition, the other end of the primary winding of the transformer T2 is connected to a node N4 between switch circuits SW7, SW8. Also in this case, it is possible to achieve advantageous effects similar to those of the power converter apparatus 2L of FIG. 24.

Fourth Embodiment

Figure 27:
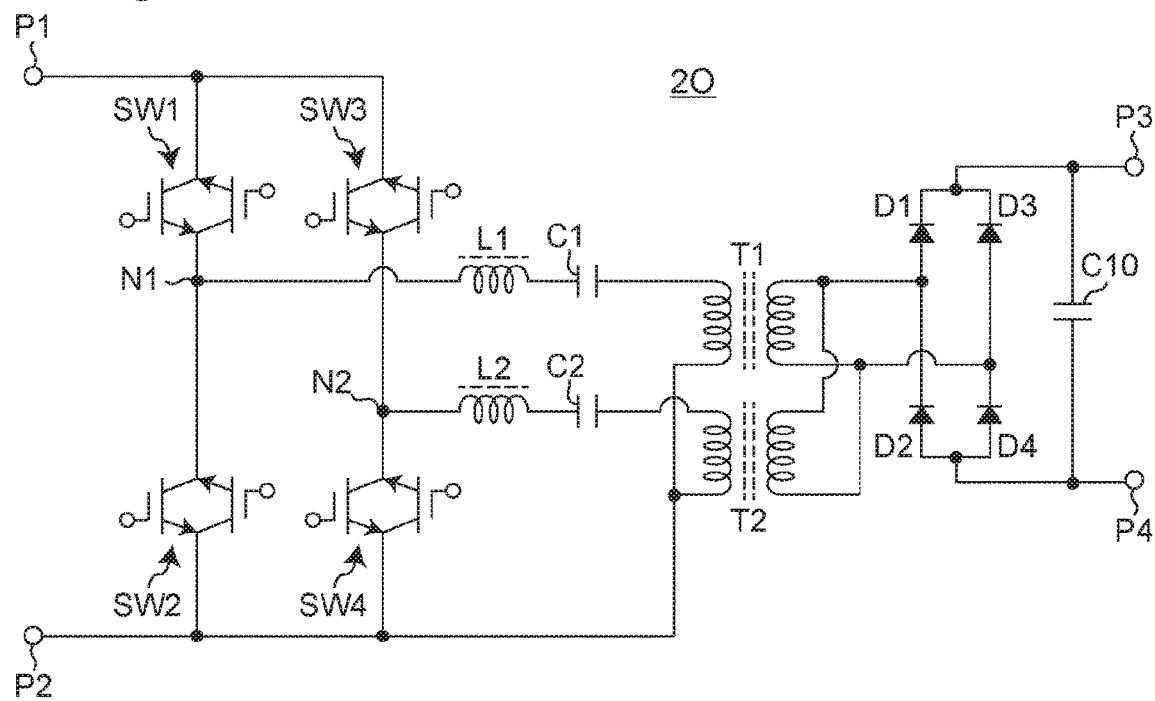
FIG. 27 is a block diagram showing a configuration of a power converter apparatus 2O according to a fourth embodiment.

FIG. 27 is a block diagram showing a configuration of a power converter apparatus 2O according to a fourth embodiment. The power converter apparatus 2O of FIG. 27 is provided with the components of the power converter apparatus 2L of FIG. 21, and further provided with an inductor L2 and a transformer T2. Primary windings of the transformers T1, T2 have inductances different from each other, and secondary windings of the transformers T1, T2 are connected in parallel with each other. The primary windings of the transformers T1, T2 are connected to at least two nodes in at least two first leg circuits among the plurality of leg circuits, respectively, each of the at least two nodes being disposed between the two switch circuits in one of the at least two first leg circuits. In the example of FIG. 27, one end of the primary winding of the transformer T1 is connected to anode N1 between switch circuits SW1, SW2 via a capacitor C1 and an inductor L1. In addition, one end of the primary winding of the transformer T2 is connected to a node N2 between switch circuits SW3, SW4 via a capacitor C2 and an inductor L2 having capacitance and inductance different from at least one of capacitance of the capacitor C1 and inductance of the inductor L1. In addition, the other ends of the primary windings of the transformers T1, T2 are connected to the input terminal P1 or P2 (input terminal P2 in the example of FIG. 27). Also in this case, the power converter apparatus according to the present embodiment is an LLC resonant power converter apparatus capable of generating a wide range of output voltage with higher efficiency than that of the prior art, in a manner similar to that of the power converter apparatus according to the first embodiment.

As a further modified embodiment of the first to fourth embodiments, a plurality of LLC resonant circuits including a plurality of transformers and a plurality of capacitors, respectively, at least one of capacitances and inductances being different in the plurality of transformers and the plurality of capacitors, may be selectively operated. In addition, a plurality of LLC resonant circuits including a plurality of transformers and a plurality of inductors, respectively, the plurality of transformers and the plurality of inductors having inductances different from each other, may be selectively operated.

A size and cost of a power converter apparatus can be reduced by selectively operating a plurality of LLC resonant circuits including a plurality of inductors or a plurality of capacitors, respectively, than selectively operating a plurality of LLC resonant circuits including a plurality of transformers, respectively. In addition, a size and cost of a power converter apparatus can be reduced by selectively operating a plurality of LLC resonant circuits including a plurality of capacitors, respectively, than selectively operating a plurality of LLC resonant circuits including a plurality of inductors, respectively.

Other Modified Embodiments

Figure 28:
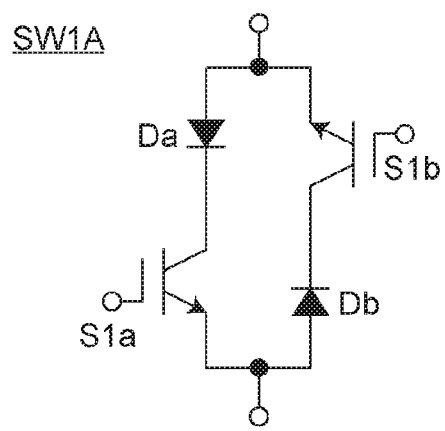
FIG. 28 is a circuit diagram showing a configuration of an alternative switch circuit SW1A.
Figure 29:
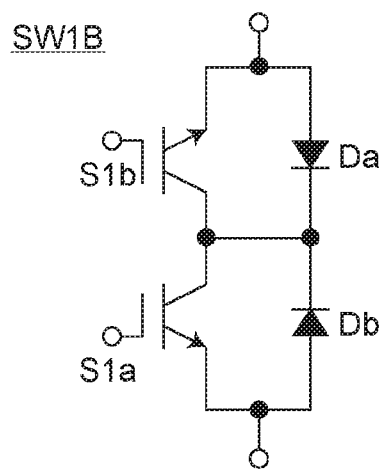
FIG. 29 is a circuit diagram showing a configuration of an alternative switch circuit SW1B.
Figure 30:
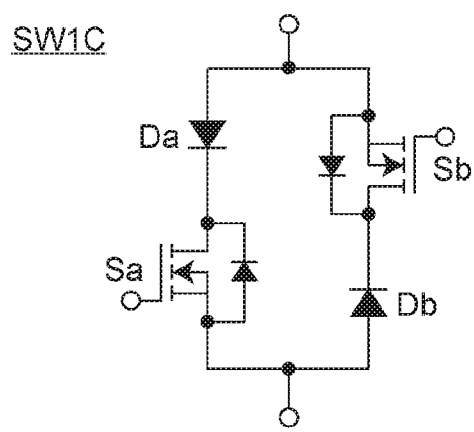
FIG. 30 is a circuit diagram showing a configuration of an alternative switch circuit SW1C.
Figure 31:
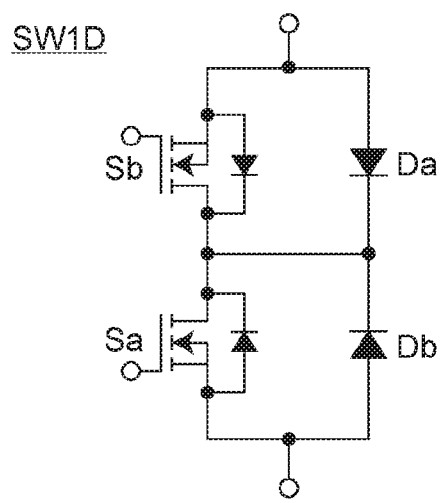
FIG. 31 is a circuit diagram showing a configuration of an alternative switch circuit SW1D.

FIGS. 28 to 31 are circuit diagrams showing configurations of alternative switch circuits SW1A to SW1D. In the examples of FIG. 1 and others, a case where each switch circuit includes only two switch elements has been described. However, each switch circuit may have any other configuration as long as being capable of selectively changing among a state where a current flows in a first direction, a state where a current flows in a second direction, and a state where no current flows in the first direction nor in the second direction. Each of the switch circuit SW1A of FIG. 28 and the switch circuit SW1B of FIG. 29 is provided with two switch elements S1$a$, S1$b$ and two diodes Da, Db. In the examples of FIGS. 28 and 29, the switch elements S1$a$, S1$b$ are not required to have high performance to withstand a reverse bias voltage, because the diodes Da, Db are provided for blocking a reverse current. Therefore, in this case, the switch elements S1a, S1b may not be of the reverse-blocking type, but normal IGBTs. In addition, each of the switch circuit SW1C of FIG. 30 and the switch circuit SW1D of FIG. 31 is provided with two switch elements Sa, Sb and two diodes Da, Db. The switch elements Sa, Sb are, for example, metal-oxide-semiconductor field-effect transistors (MOSFETs), in the example of FIG. 31, external diodes Da, Db may be removed by using body diodes of the MOSFETs. A power converter apparatus including any one of the switch circuits SW1A to SW1D of FIGS. 28 to 31 also operates in a manner similar to that of the power converter apparatuses of FIG. 1 and others, and achieves advantageous effects similar to those of the power converter apparatuses of FIG. 1 and others.

INDUSTRIAL APPLICABILITY

The power converter apparatus according to the present disclosure is applicable to, for example, an on-board power converter apparatus for charging a battery of an electric vehicle or a hybrid vehicle.

REFERENCE SIGNS LIST

1: POWER SUPPLY APPARATUS
2, 2A to 2O: POWER CONVERTER APPARATUS
3, 3A: LOAD APPARATUS
11: SWITCH CIRCUIT GROUP
12: DIODE BRIDGE
13: VOLTAGE DETECTOR
14: CURRENT DETECTOR
15: CONTROLLER
C1 to C3, C10: CAPACITOR
D1 to D4, D1, Db: DIODE
L1 to 3: INDUCTOR
P1, P2: INPUT TERMINAL
P3, P4: OUTPUT TERMINAL
SW1 to SW6, SW1A to SW1D: SWITCH CIRCUIT
S1a to S6b: SWITCH ELEMENT
T1, T2: TRANSFORMER

The invention claimed is:

1. A power converter apparatus comprising:
a first input terminal and a second input terminal;
a plurality of leg circuits, each of the plurality of leg circuits including two switch circuits connected in series with each other between the first input terminal and the second input terminal;
a transformer including a primary winding and a secondary winding, the primary winding having a first terminal and a second terminal; and
at least one capacitor,
wherein the at least one capacitor is connected between the first terminal or the second terminal of the primary winding of the transformer, and a node between the two switch circuits in at least one leg circuit among the plurality of leg circuits,
wherein the first terminal of the primary winding of the transformer is connected to at least two nodes in at least two first leg circuits among the plurality of leg circuits via at least two first circuit portions, respectively, each of the at least two nodes being disposed between the two switch circuits in one of the at least two first leg circuits, at least one of capacitances and inductances being different in the at least two first circuit portions, wherein the second terminal of the primary winding of the transformer is connected to a node between the two switch circuits in at least one second leg circuit among the plurality of leg circuits, and
wherein the second terminal of the primary winding of the transformer is connected to at least two nodes in at least two second leg circuits among the plurality of leg circuits via at least two second circuit portions, respectively, each of the at least two nodes being disposed between the two switch circuits in one of the at least two second leg circuits, at least one of capacitances and inductances being different in the at least two second circuit portions.

2. The power converter apparatus as claimed in claim 1, wherein each of the switch circuits comprises two switch elements, and selectively changes among a state where a current flows in a first direction, a state where a current flows in a second direction opposite to the first direction, and a state where no current flows in the first direction nor in the second direction.

3. The power converter apparatus as claimed in claim 1, further comprising:
output terminals connected to a load apparatus;
a voltage detector that detects an output voltage outputted from the power converter apparatus to the load apparatus;
a current detector that detects an output current outputted from the power converter apparatus to the load apparatus; and
a controller that controls the switch circuits of the leg circuits,
wherein the controller operates the two switch circuits in at least one first leg circuit in the at least two first leg circuits at a switching frequency, and makes the two switch circuits in the first leg circuits other than the at least one first leg circuit inoperative, based on the output voltage and the output current.

4. The power converter apparatus as claimed in claim 3, wherein the controller determines, in the at least two first leg circuits, a first leg circuit including operating switch circuits, and a first leg circuit including inoperative switch circuits, based on which of a plurality of predetermined voltage ranges includes the output voltage.

5. The power converter apparatus as claimed in claim 3, wherein the controller determines the switching frequency based on:
the capacitance and the inductance included in a path from the first input terminal to the second input terminal, via the switch circuit turned on by the controller, and the primary winding of the transformer,
the output voltage and the output current, and
a target voltage outputted to the load apparatus.

6. The power converter apparatus as claimed in claim 3, wherein the controller controls the switch circuits to achieve zero voltage switching, when changing the switch circuits in the at least two first leg circuits between an operating state and an inoperative state.

7. A power converter apparatus comprising:
a first input terminal and a second input terminal;
a plurality of leg circuits, each of the plurality of leg circuits including two switch circuits connected in series with each other between the first input terminal and the second input terminal;
a transformer including a primary winding and a secondary winding, the primary winding having a first terminal and a second terminal; and
at least one capacitor, wherein the at least one capacitor is connected between the first terminal or the second terminal of the primary winding of the transformer, and a node between the two switch circuits in at least one leg circuit among the plurality of leg circuits, wherein the first terminal of the primary winding of the transformer is connected to at least two nodes in at least two first leg circuits among the plurality of leg circuits via at least two first circuit portions, respectively, each of the at least two nodes being disposed between the two switch circuits in one of the at least two first leg circuits, at least one of capacitances and inductances being different in the at least two first circuit portions, wherein the second terminal of the primary winding of the transformer is connected to the first input terminal or the second input terminal without the switch circuits intervening therebetween.

8. A power converter apparatus comprising:

a first input terminal and a second input terminal;

a plurality of leg circuits, each of the plurality of leg circuits including two switch circuits connected in series with each other between the first input terminal and the second input terminal;

at least two transformers, each of the at least two transformers including a primary winding and a secondary winding; and at least one capacitor, wherein the at least one capacitor is connected between the primary winding of each of the transformers, and a node between the two switch circuits in at least one leg circuit among the plurality of leg circuits, wherein the primary windings of the transformers have inductances different from each other, and the secondary windings of the transformers are connected in parallel with each other, and wherein the primary windings of the transformers are connected to at least two nodes in at least two first leg circuits among the plurality of leg circuits, respectively, each of the at least two nodes being disposed between the two switch circuits in one of the at least two first leg circuits.

* * * * *